(12) United States Patent
Nishio et al.

(10) Patent No.: US 11,574,571 B2
(45) Date of Patent: Feb. 7, 2023

(54) DISPLAY DEVICE HAVING SWITCHING SIGNAL LINE BETWEEN DISPLAY REGIONS

(71) Applicant: SHARP KABUSHIKI KAISHA, Sakai (JP)

(72) Inventors: Masaaki Nishio, Sakai (JP); Noriyuki Tanaka, Sakai (JP); Kazuo Nakamura, Sakai (JP); Hongbing Weng, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/593,443

(22) PCT Filed: Mar. 26, 2019

(86) PCT No.: PCT/JP2019/012761
§ 371 (c)(1),
(2) Date: Sep. 18, 2021

(87) PCT Pub. No.: WO2020/194492
PCT Pub. Date: Oct. 1, 2020

(65) Prior Publication Data
US 2022/0180782 A1 Jun. 9, 2022

(51) Int. Cl.
*G09G 3/00* (2006.01)
*G06F 1/16* (2006.01)

(52) U.S. Cl.
CPC .......... *G09G 3/035* (2020.08); *G06F 1/1652* (2013.01); *G09G 2330/021* (2013.01)

(58) Field of Classification Search
CPC ............. G09G 3/035; G09G 2330/021; G09G 3/3266; G09G 3/3216; G09G 3/3677;
(Continued)

(56) References Cited

U.S. PATENT DOCUMENTS 6,784,868 B2 * 8/2004 Murahashi ........... G09G 3/3681
345/545
2005/0179640 A1 8/2005 Tanaka et al.
(Continued)

FOREIGN PATENT DOCUMENTS

JP 2003-344823 A 12/2003
JP 2004-117755 A 4/2004
(Continued)

*Primary Examiner* — Richard J Hong
(74) *Attorney, Agent, or Firm* — ScienBiziP, P.C.

(57) ABSTRACT

A display panel includes a second display region and a first display region arranged side by side in a direction in which data signal lines extend, and a source driver provided in a picture-frame region close to the second display region. The display panel further includes a switching signal line disposed between the second display region and the first display region, and a plurality of switches provided at intersecting portions of the data signal lines and the switching signal line. Each of the plurality of switches is connected at a control terminal thereof to the switching signal line, connected at a first conductive terminal thereof to a data signal line disposed in the first display region, and connected at a second conductive terminal thereof to a data signal line disposed in the second display region.

16 Claims, 15 Drawing Sheets

(58) Field of Classification Search
CPC ...... G09G 3/20; G09G 3/3681; G09G 3/3696; G06F 1/1652; G06F 3/1446; G06F 1/1641; G11C 19/28
See application file for complete search history.

(56) References Cited

U.S. PATENT DOCUMENTS

| | | | |
|---|---|---|---|
| 2005/0231494 A1 | 10/2005 | Kumada et al. | |
| 2006/0022913 A1* | 2/2006 | Takayanagi | G09G 3/3216 345/76 |
| 2009/0284500 A1 | 11/2009 | Yamashita | |
| 2010/0141850 A1* | 6/2010 | Itoh | G09G 3/3677 348/731 |
| 2010/0188375 A1* | 7/2010 | Lee | G09G 3/3266 345/204 |
| 2012/0212517 A1* | 8/2012 | Ahn | G11C 19/28 345/77 |
| 2013/0222441 A1* | 8/2013 | Yokoyama | G06F 3/1446 345/690 |
| 2015/0138041 A1 | 5/2015 | Hirakata et al. | |
| 2017/0185289 A1* | 6/2017 | Kim | G06F 1/1641 |
| 2018/0158431 A1* | 6/2018 | Fujikawa | G09G 3/3696 |
| 2020/0342825 A1* | 10/2020 | Kurokawa | G09G 3/20 |

FOREIGN PATENT DOCUMENTS

| | | |
|---|---|---|
| JP | 2005-331916 A | 12/2005 |
| JP | 2007-114259 A | 5/2007 |
| JP | 2008-203726 A | 9/2008 |
| JP | 2009-276547 A | 11/2009 |
| JP | 2015-118373 A | 6/2015 |
| WO | 2015/071820 A1 | 5/2015 |

* cited by examiner

DISPLAY DEVICE HAVING SWITCHING SIGNAL LINE BETWEEN DISPLAY REGIONS

TECHNICAL FIELD

The following disclosure relates to a display device, and more specifically to a display device configured to be able to be bent at a portion between two display regions.

BACKGROUND ART

In recent years, regarding a display device such as an organic EL display device and a liquid crystal display device, an increase in resolution and an increase in the size of a screen have advanced. Due to this, a panel load is large compared with that of a known configuration, increasing power consumption. Moreover, to improve display quality, an increase in luminance and an increase in frame rate are advancing. In terms of this, too, power consumption increases. Further, with the advancement of an increase in resolution and increase in frame rate, drive time per line is reduced, and in order to implement the reduction in drive time, there is a need to improve the ability of a drive circuit (e.g., an LSI), which leads to an increase in power consumption. Regarding a display device, power consumption has increased as described above, and thus, an increase in the size of the drive circuit and an increase in the performance of peripheral parts are required. Such requirements are particularly remarkable in a display device used for virtual reality (VR) (e.g., a head mounted display). However, an increase in the size of the drive circuit and an increase in the performance of peripheral parts are big factors in cost increase.

In relation to this matter, Japanese Laid-Open Patent Publication No. 2003-344823 and Japanese Laid-Open Patent Publication No. 2009-276547 disclose display devices having a configuration in which switching elements whose on/off is controlled by a control signal are provided on data signal lines (source bus lines). In such a configuration, when a switching element is turned off, a data signal line on one side with respect to the position of the switching element (hereinafter, referred to as "first line".) and a data signal line on the other side (hereinafter, referred to as "second line".) go into an electrically disconnected state. Here, assuming that a source driver is directly connected to the first line, when a data signal is written into a pixel circuit connected to the first line, the switching element is turned off. At this time, a wiring load on the data signal line is reduced compared with that of a configuration in which the switching elements are not provided on the data signal lines. By this, power consumption related to driving of the data signal lines is reduced.

PRIOR ART DOCUMENTS

Patent Documents

[Patent Document 1] Japanese Laid-Open Patent Publication No. 2003-344823
[Patent Document 2] Japanese Laid-Open Patent Publication No. 2009-276547

SUMMARY

Problems to be Solved by the Invention

Meanwhile, in recent years, development of a bendable (foldable) display device (typically, a mobile phone such as a smartphone) has advanced. In such a display device, two display regions are provided in such a way as to sandwich a bending position. Normally, different images are displayed in the two display regions. The bendable display device needs to thus display images in at least two display regions, and thus, an increase in power consumption is remarkable. Neither of Japanese Laid-Open Patent Publication No. 2003-344823 and Japanese Laid-Open Patent Publication No. 2009-276547 mentions a bendable display device.

An object of the following disclosure is therefore to reduce power consumption compared to a known configuration in a bendable (foldable) display device.

Means for Solving the Problems

A display device according to some embodiments of the present disclosure is a display device that is foldable and displays an image by writing a data signal into a plurality of pixel circuits arranged in a display panel, wherein
the display panel includes:
  a plurality of data signal lines configured to transmit the data signal;
  a plurality of scanning signal lines intersecting the plurality of data signal lines;
  the plurality of pixel circuits provided at intersecting portions of the plurality of data signal lines and the plurality of scanning signal lines;
  a first display region and a second display region in which the plurality of data signal lines are disposed;
  a picture-frame region that encloses the first display region and the second display region;
  a data signal line drive circuit configured to apply the data signal to the plurality of data signal lines; and
  a scanning signal line drive circuit configured to drive the plurality of scanning signal lines,
the first display region and the second display region are arranged side by side in a direction in which the plurality of data signal lines extend,
the data signal line drive circuit is provided in a region in the picture-frame region so that the data signal is applied to data signal lines disposed in the second display region earlier than data signal lines disposed in the first display region, the region in the picture-frame region being closer to the second display region than to the first display region and
the display panel further includes:
  a first switching signal line disposed between the first display region and the second display region, the first switching signal line extending in parallel to the plurality of scanning signal lines so as to intersect the plurality of data signal lines; and
  a plurality of first switching elements provided at intersecting portions of the plurality of data signal lines and the first switching signal line, the plurality of first switching elements each having a control terminal connected to the first switching signal line, a first conductive terminal connected to a data signal line disposed in the first display region, and a second conductive terminal connected to a data signal line disposed in the second display region.

Effects of the Invention

According to some embodiments of the present disclosure, in a foldable display device, two display regions (a first display region and a second display region) are provided in a display panel. In addition, in the display panel there are provided first switching elements that control a state of electrical connection between data signal lines disposed in the first display region and data signal lines disposed in the second display region, and control terminals of the first switching elements are connected to a first switching signal line disposed between the first display region and the second display region. Accordingly, by providing a control signal to the first switching signal line, the on/off of the first switching elements can be controlled. Here, a data signal line drive circuit is provided in a picture-frame region close to the second display region, and thus, when writing of the data signal into pixel circuits included in the second display region is performed, the first switching elements are turned off, by which data signal lines disposed in the first display region and data signal lines disposed in the second display region can be brought into an electrically disconnected state. By this, wiring loads on the data signal lines upon writing the data signal into pixel circuits included in the second display region are smaller than those of an original configuration, reducing power consumption compared with that of a known configuration. As above, in the foldable display device, power consumption can be reduced compared to the known configuration.

MODES FOR CARRYING OUT THE INVENTION

Embodiments will be described below with reference to the accompanying drawings. Note that in the following, N and J are assumed to be integers greater than or equal to 2, M is assumed to be an integer greater than or equal to 4, p is assumed to be an integer between 1 and M, inclusive, and q is assumed to be an integer between 1 and J, inclusive.

1. First Embodiment 1.1 Functional Configuration

Figure 2:
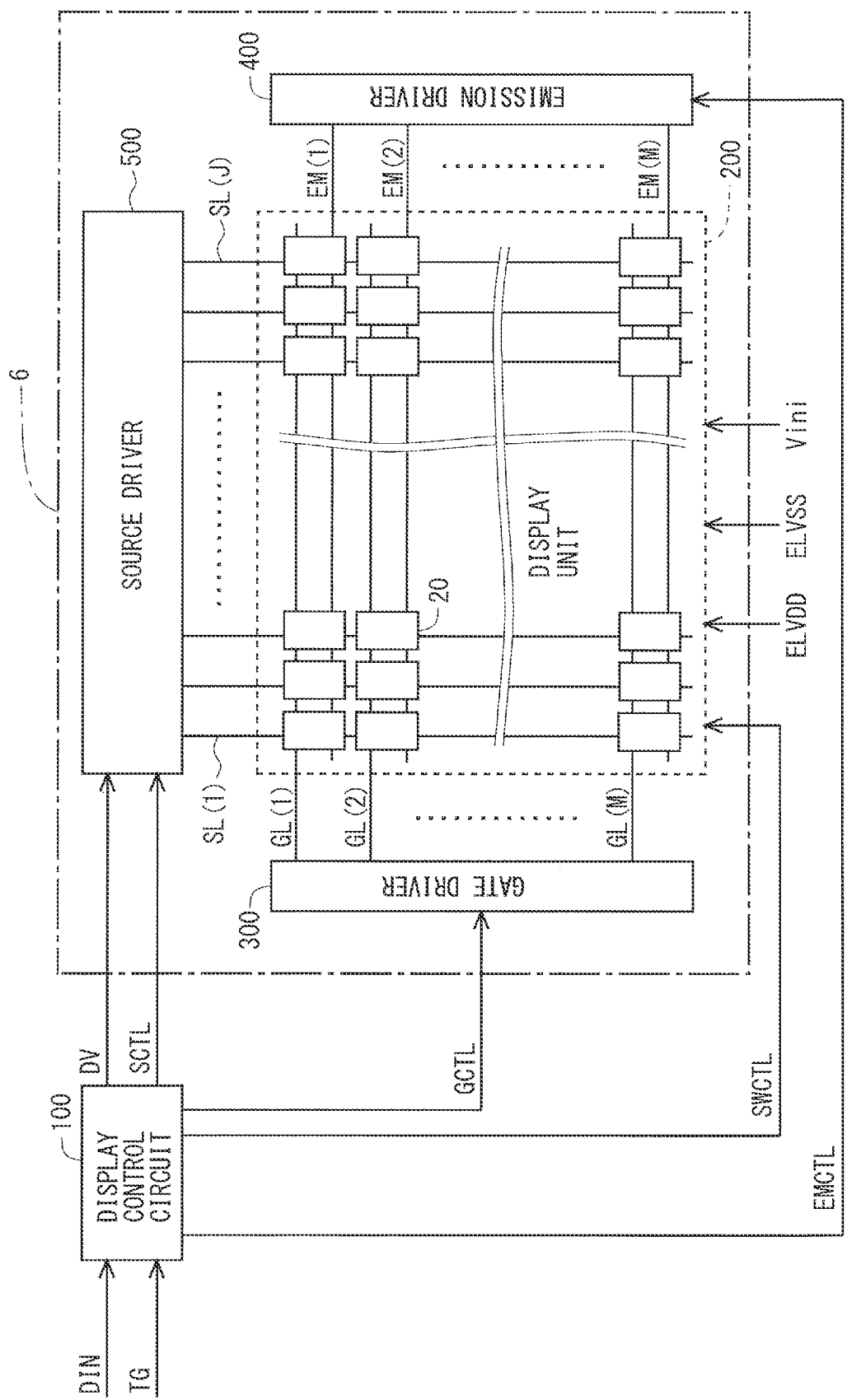
FIG. 2 is a block diagram showing a functional configuration of an organic EL display device according to the first embodiment.

FIG. 2 is a block diagram showing a functional configuration of an organic EL display device according to a first embodiment. As shown in FIG. 2, the organic EL display device includes a display control circuit 100, a display unit 200, a gate driver (scanning signal line drive circuit) 300, an emission driver (light emission control line drive circuit) 400, and a source driver (data signal line drive circuit) 500. In the present embodiment, the gate driver 300, the emission driver 400, and the source driver 500 are included in an organic EL display panel (hereinafter, referred to as "organic EL panel".) 6 including the display unit 200. Regarding this, typically, the gate driver 300 and the emission driver 400 are monolithically formed. Note, however, that a configuration in which they are not monolithically formed can also be adopted. The source driver 500 may also be monolithically formed or may not be monolithically formed. In addition, the source driver 500 may be directly provided on the organic EL panel 6 or may be formed of a circuit in a chip mounted on the organic EL panel 6.

In the display unit 200 there are disposed J data signal lines SL(1) to SL(J) and M scanning signal lines GL(1) to GL(M) orthogonal to the J data signal lines SL(1) to SL(J). Moreover, in the display unit 200, M light emission control lines EM(1) to EM(M) are disposed so as to have a one-to-one correspondence with the M scanning signal lines GL(1) to GL(M). The scanning signal lines GL(1) to GL(M) and the light emission control lines EM(1) to EM(M) are typically parallel to each other. Furthermore, in the display unit 200, J×M pixel circuits 20 are provided at intersecting portions of the J data signal lines SL(1) to SL(J) and the M scanning signal lines GL(1) to GL(M). In the following, scanning signals provided to the respective M scanning signal lines GL(1) to GL(M) are also given reference characters GL(1) to GL(M), light emission control signals provided to the respective M light emission control lines EM(1) to EM(M) are also given reference characters EM(1) to EM(M), and data signals provided to the respective J data signal lines SL(1) to SL(J) are also given reference characters SL(1) to SL(J), as necessary. Note that the display unit 200 of the present embodiment includes two display regions (a first display region and a second display region), the detailed description of which will be made later.

In the display unit 200 there are also disposed power supply lines (not shown) common to the pixel circuits 20. More specifically, there are disposed a power supply line (hereinafter, referred to as "high-level power supply line") that supplies a high-level power supply voltage ELVDD for driving organic EL light-emitting elements (hereinafter, referred to as "organic EL element".), a power supply line (hereinafter, referred to as "low-level power supply line") that supplies a low-level power supply voltage ELVSS for driving the organic EL elements, and a power supply line (hereinafter, referred to as "initialization power supply line") that supplies an initialization voltage Vini. The high-level power supply voltage ELVDD, the low-level power supply voltage ELVSS, and the initialization voltage Vini are supplied from a power supply circuit which is not shown.

The operation of each component shown in FIG. 2 will be described below. The display control circuit 100 receives an input image signal DIN and a timing signal group (a horizontal synchronizing signal, a vertical synchronizing signal, etc.) TG which are transmitted from an external source, and outputs digital video signals DV, gate control signals GCTL that control the operation of the gate driver 300, emission driver control signals EMCTL that control the operation of the emission driver 400, source control signals SCTL that control the operation of the source driver 500, and a switch control signal SWCTL whose details will be described later. The gate control signals GCTL include a gate start pulse signal, a gate clock signal, etc. The emission driver control signals EMCTL include an emission start pulse signal, an emission clock signal, etc. The source control signals SCTL include a source start pulse signal, a source clock signal, a latch strobe signal, etc.

The gate driver 300 is connected to the M scanning signal lines GL(1) to GL(M). The gate driver 300 applies scanning signals to the M scanning signal lines GL(1) to GL(m), based on the gate control signals GCTL outputted from the display control circuit 100.

The emission driver 400 is connected to the M light emission control lines EM(1) to EM(M). The emission driver 400 applies light emission control signals to the M light emission control lines EM(1) to EM(M), based on the emission driver control signals EMCTL outputted from the display control circuit 100.

The source driver 500 includes a J-bit shift register, a sampling circuit, a latch circuit, J D/A converters, etc., which are not shown. The shift register has J cascade-connected registers. The shift register sequentially transfers a pulse of the source start pulse signal supplied to a register at an initial stage, from an input terminal to an output terminal, based on the source clock signal. According to the transfer of the pulse, a sampling pulse is outputted from each stage of the shift register. Based on the sampling pulse, the sampling circuit stores a digital video signal DV. The latch circuit captures and holds digital video signals DV for one row which are stored in the sampling circuit, in accordance with the latch strobe signal. The D/A converters are provided so as to correspond to the respective data signal lines SL(1) to SL(J). The D/A converters convert the digital video signals DV held in the latch circuit into analog voltages. The converted analog voltages are simultaneously applied, as data signals, to all data signal lines SL(1) to SL(J).

In the above-described manner, the data signals are applied to the J data signal lines SL(1) to SL(J), the scanning signals are applied to the M scanning signal lines GL(1) to GL(M), and the light emission control signals are applied to the M light emission control lines EM(1) to EM(M), by which an image based on the input image signal DIN is displayed on the display unit 200.

1.2 Display Unit

Figure 3:
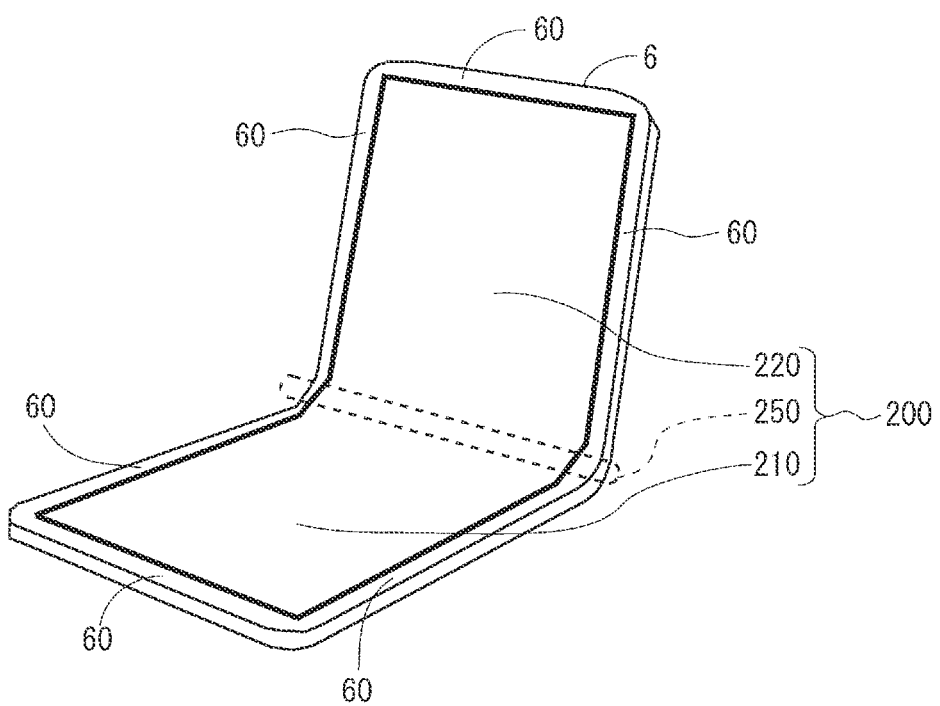
FIG. 3 is a perspective view of the organic EL display device according to the first embodiment.

Next, with reference to FIGS. 3 and 1, the display unit 200 of the present embodiment will be described in detail. FIG. 3 is a perspective view of an organic EL display device according to the present embodiment. As shown in FIG. 3, the display unit 200 includes a first display region 210 and a second display region 220. A picture-frame region 60 is present in such a way as to enclose the first display region 210 and the second display region 220. Different images can be displayed in the first display region 210 and the second display region 220. In addition, the organic EL panel 6 is provided with a bending portion 250 that straddles the first display region 210 and the second display region 220. By this, it becomes possible to fold the organic EL panel 6 such that the front of the first display region 210 and the front of the second display region 220 face each other or the back of the first display region 210 and the back of the second display region 220 face each other.

Figure 1:
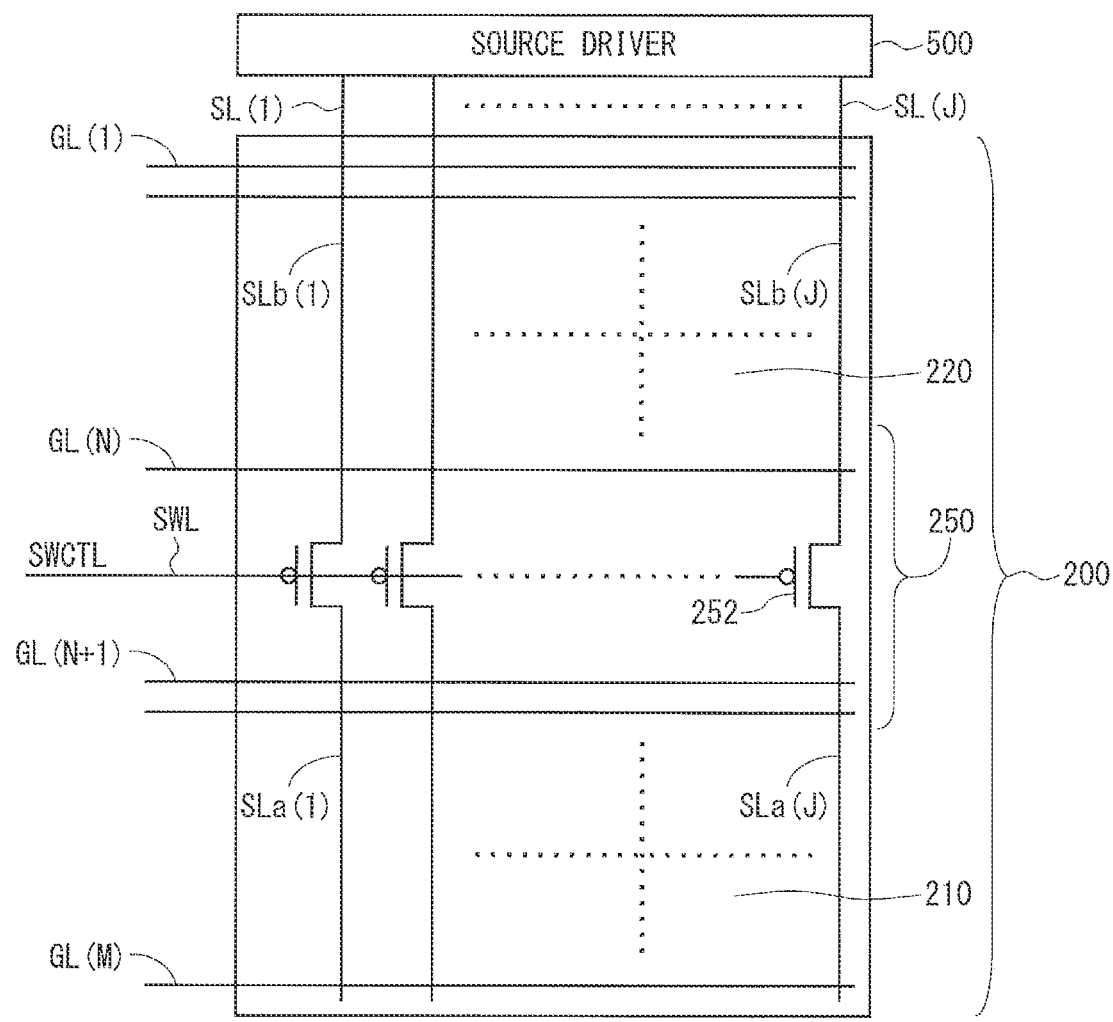
FIG. 1 is a diagram for describing a configuration of a display unit of an organic EL display device according to a first embodiment.

As shown in FIG. 1, the first display region 210 and the second display region 220 are arranged side by side in a direction in which the data signal lines SL(1) to SL(J) extend. In addition, as shown in FIG. 1, each data signal line SL includes a portion disposed in the second display region 220 and a portion disposed in the first display region 210. Here data signal lines disposed in the second display region 220 are referred to as "second data signal lines", and data signal lines disposed in the first display region 210 are referred to as "first data signal lines". A data signal line indicated by reference character including "a" is a first data signal line, and a data signal line indicated by reference character including "b" is a second data signal line. The source driver 500 is provided at one edge of the second display region 220 (a region in the picture-frame region 60 shown in FIG. 3 that is closer to the second display region 220 than to the first display region 210) so that data signals are applied to second data signal lines SLb earlier than first data signal lines SLa. In other words, the source driver 500 is provided on one side (an upper side in FIG. 1) with respect to the second display region 220, and the first display region 210 is provided on the other side (a lower side in FIG. 1) with respect to the second display region 220 via the bending portion 250. Note that the configuration may be such that the source driver 500 is provided on a lower side of the second display region 220 in FIG. 1 with respect to the second display region 220 and the first display region 210 is provided on an upper side of the second display region 220 in FIG. 1 via the bending portion 250.

In the bending portion 250 there is disposed a switching signal line SWL extending in parallel to the M scanning signal lines GL(1) to GL(M) so as to intersect the J data signal lines SL(1) to SL(J). Furthermore, the bending portion 250 includes J switches (analog switches) 252 provided at intersecting portions of the J data signal lines SL(1) to SL(J) and the switching signal line SWL. In other words, the bending portion 250 overlaps the J switches 252. First data signal lines SLa(1) to SLa(J) and second data signal lines SLb(i) to SLb(J) are connected to each other through their corresponding switches 252. The switching signal line SWL transmits a switch control signal SWCTL that controls on/off of the J switches 252. Each switch 252 is connected at its control terminal to the switching signal line SWL, connected at its first conductive terminal to a first data signal line SLa through a contact hole, and connected at its second conductive terminal to a second data signal line SLb through a contact hole. By such a configuration, the switch 252 functions to control a state of electrical connection between the first data signal line SLa and the second data signal line SLb.

Note that, typically, a semiconductor layer of the switch 252 is formed in the same layer as a semiconductor layer that forms the pixel circuit 20, and using the same material as the semiconductor layer that forms the pixel circuit 20. In the present embodiment, the switch 252 is implemented by a p-channel thin-film transistor (TFT). Note, however, that the configuration is not limited thereto, and the switch 252 may be implemented by an element other than a p-channel thin-film transistor.

In the present embodiment, the first switching signal line is implemented by the switching signal line SWL and the first switching element is implemented by the switch 252.

1.3 Pixel Circuits

Figure 4:
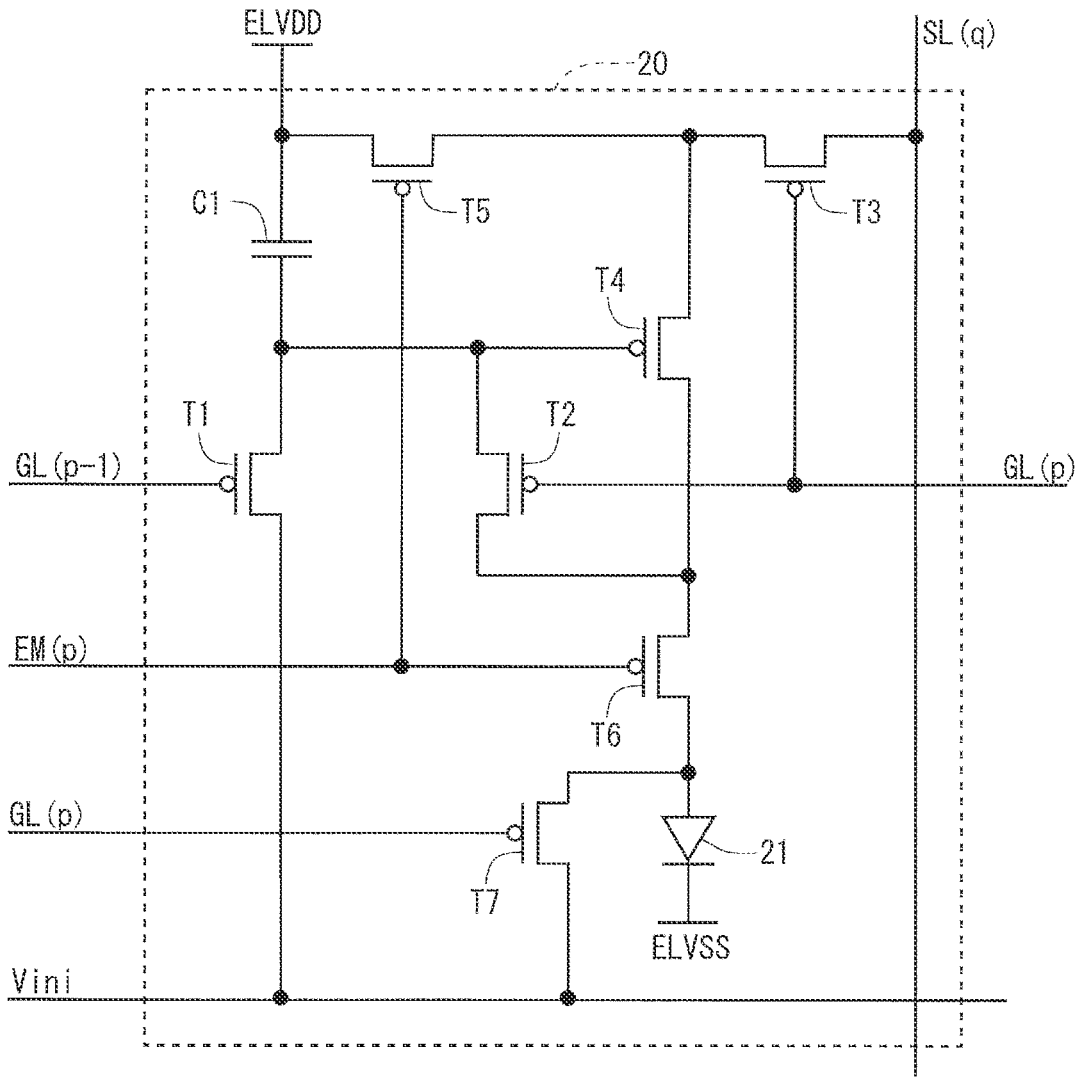
FIG. 4 is a circuit diagram showing a configuration of a pixel circuit provided in row p and column q in the first embodiment.

Next, the configuration and operation of the pixel circuit 20 in the display unit 200 will be described. Note that the configuration of the pixel circuit 20 shown here is an example and the configuration is not limited thereto. FIG. 4 is a circuit diagram showing a configuration of a pixel circuit 20 provided in row p and column q. The pixel circuit 20 shown in FIG. 4 includes one organic EL element 21; seven transistors T1 to T7 (an initialization transistor T1, a threshold voltage compensation transistor T2, a write control transistor T3, a drive transistor T4, a power supply control transistor T5, a light emission control transistor T6, and an anode control transistor T7); and one holding capacitor C1. The transistors T1 to T7 are p-channel thin-film transistors. The holding capacitor C1 is a capacitive element composed of two electrodes (a first electrode and a second electrode).

The initialization transistor T1 is connected at its control terminal to a scanning signal line GL(p−1) in a (p−1)th row, connected at its first conductive terminal to a second conductive terminal of the threshold voltage compensation transistor T2, a control terminal of the drive transistor T4, and a second electrode of the holding capacitor C1, and connected at its second conductive terminal to the initialization power supply line. The threshold voltage compensation transistor T2 is connected at its control terminal to a scanning signal line GL(p) in a pth row, connected at its first conductive terminal to a second conductive terminal of the drive transistor T4 and a first conductive terminal of the light emission control transistor T6, and connected at its second conductive terminal to the first conductive terminal of the initialization transistor T1, the control terminal of the drive transistor T4, and the second electrode of the holding capacitor C1. The write control transistor T3 is connected at its control terminal to the scanning signal line GL(p) in the pth row, connected at its first conductive terminal to a data signal line SL(q) in a qth column, and connected at its second conductive terminal to a first conductive terminal of the drive transistor T4 and a second conductive terminal of the power supply control transistor T5. The drive transistor T4 is connected at its control terminal to the first conductive terminal of the initialization transistor T1, the second conductive terminal of the threshold voltage compensation transistor T2, and the second electrode of the holding capacitor C1, connected at its first conductive terminal to the second conductive terminal of the write control transistor T3 and the second conductive terminal of the power supply control transistor T5, and connected at its second conductive terminal to the first conductive terminal of the threshold voltage compensation transistor T2 and the first conductive terminal of the light emission control transistor T6.

The power supply control transistor T5 is connected at its control terminal to a light emission control line EM(p) in the pth row, connected at its first conductive terminal to a high-level power supply line and a first electrode of the holding capacitor C1, and connected at its second conductive terminal to the second conductive terminal of the write control transistor T3 and the first conductive terminal of the drive transistor T4. The light emission control transistor T6 is connected at its control terminal to the light emission control line EM(p) in the pth row, connected at its first conductive terminal to the first conductive terminal of the threshold voltage compensation transistor T2 and the second conductive terminal of the drive transistor T4, and connected at its second conductive terminal to a first conductive terminal of the anode control transistor T7 and an anode terminal of the organic EL element 21. The anode control transistor T7 is connected at its control terminal to a scanning signal line GL(p) in the pth row, connected at its first conductive terminal to the second conductive terminal of the light emission control transistor T6 and the anode terminal of the organic EL element 21, and connected at its second conductive terminal to the initialization power supply line. The holding capacitor C1 is connected at its first electrode to the high-level power supply line and the first conductive terminal of the power supply control transistor T5, and connected at its second electrode to the first conductive terminal of the initialization transistor T1, the second conductive terminal of the threshold voltage compensation transistor T2, and the control terminal of the drive transistor T4. The organic EL element 21 is connected at its anode terminal to the second conductive terminal of the light emission control transistor T6 and the first conductive terminal of the anode control transistor T7, and connected at its cathode terminal to the low-level power supply line.

Figure 5:
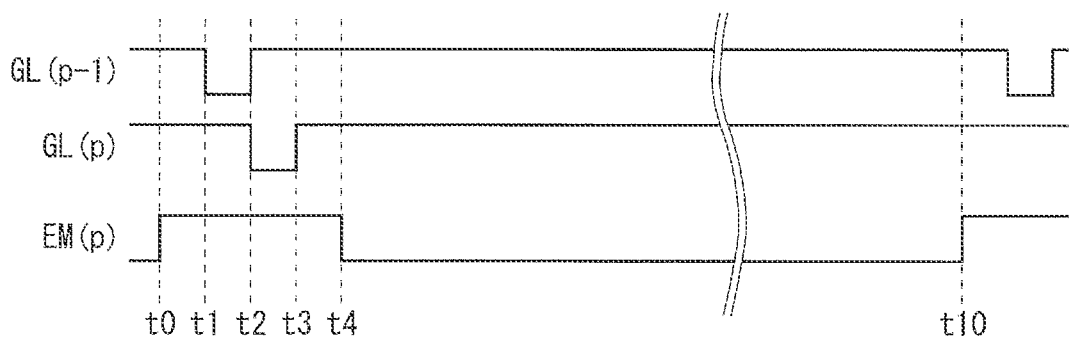
FIG. 5 is a signal waveform diagram for describing a drive method for the pixel circuit provided in row p and column q in the first embodiment.

FIG. 5 is a signal waveform diagram for describing a drive method for the pixel circuit 20 provided in row p and column q (the pixel circuit 20 shown in FIG. 4). Prior to time t0, a scanning signal GL(p−1) and a scanning signal GL(p) are at a high level, and a light emission control signal EM(p) is at a low level. At this time, the power supply control transistor T5 and the light emission control transistor T6 are in an on state, and the organic EL element 21 emits light depending on the magnitude of a drive current.

At time t0, the light emission control signal EM(p) changes from the low level to a high level. By this, the power supply control transistor T5 and the light emission control transistor T6 go into an off state. As a result, the supply of a current to the organic EL element 21 is interrupted, and the organic EL element 21 goes into a turn-off state.

At time t1, the scanning signal GL(p−1) changes from the high level to a low level. By this, the initialization transistor T1 goes into an on state. As a result, a gate voltage of the drive transistor T4 is initialized. That is, the gate voltage of the drive transistor T4 becomes equal to an initialization voltage Vini.

At time t2, the scanning signal GL(p−1) changes from the low level to the high level. By this, the initialization transistor T1 goes into an off state. In addition, at time t2, the scanning signal GL(p) changes from the high level to a low level. By this, the threshold voltage compensation transistor T2, the write control transistor T3, and the anode control transistor T7 go into an on state. By the anode control transistor T7 going into an on state, an anode voltage of the organic EL element 21 is initialized based on the initialization voltage Vini. Further, by the threshold voltage compensation transistor T2 and the write control transistor T3 going into an on state, a data signal SL(q) is provided to the second electrode of the holding capacitor C1 through the write control transistor T3, the drive transistor T4, and the threshold voltage compensation transistor T2. By this, the holding capacitor C1 is charged.

At time t3, the scanning signal GL(p) changes from the low level to the high level. By this, the threshold voltage compensation transistor T2, the write control transistor T3, and the anode control transistor 77 go into an off state.

At time t4, the light emission control signal EM(p) changes from the high level to the low level. By this, the power supply control transistor T5 and the light emission control transistor T6 go into an on state. By this, a drive current based on the charged voltage of the holding capacitor C1 is supplied to the organic EL element 21. As a result, the organic EL element 21 emits light depending on the magnitude of the drive current. Thereafter, the organic EL element 21 emits light throughout a period up to when the light emission control signal EM(p) changes from the low level to the high level at time t10.

1.4 Regarding Driving of the Data Signal Lines

Meanwhile, regarding driving of the data signal lines, it is also possible to adopt a drive scheme called "SSD" in which an output (i.e., a data signal) from the source driver 500 is shared between a plurality of data signal lines. Note that the "SSD" is an abbreviation of "source shared driving".

Figure 6:
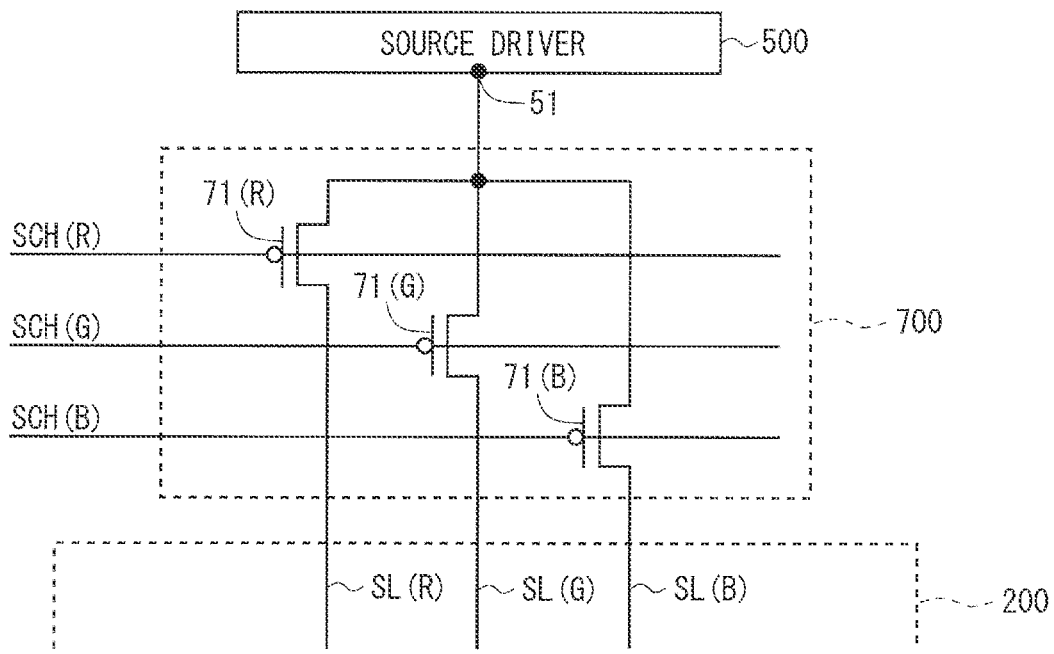
FIG. 6 is a circuit diagram for describing SSD in the first embodiment.

FIG. 6 is a circuit diagram for describing the SSD. In an organic EL display device adopting the SSD, as shown in FIG. 6, a demultiplexer unit 700 for distributing each data signal to a plurality of (three in this example) data signal lines SL is provided between the display unit 200 and the source driver 500. In the example shown in FIG. 6, the demultiplexer unit 700 is composed of a switch 71(R) for controlling a state of electrical connection between an output portion 51 that outputs a data signal and a data signal line SL(R) for red; a switch 71(G) for controlling a state of electrical connection between the output portion 51 and a data signal line SL(G) for green; and a switch 71(B) for controlling a state of electrical connection between the output portion 51 and a data signal line SL(B) for blue. The third switching elements are implemented by these switches 71(R), 71(G), and 71(B). Note that FIG. 6 only shows components provided for one output portion 51.

Figure 7:
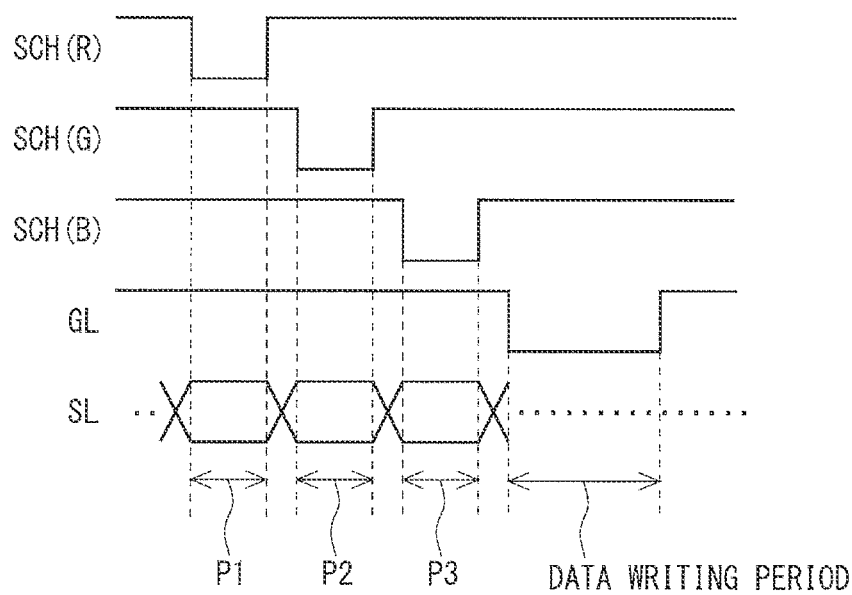
FIG. 7 is a signal waveform diagram for describing the SSD in the first embodiment.
Figure 8:
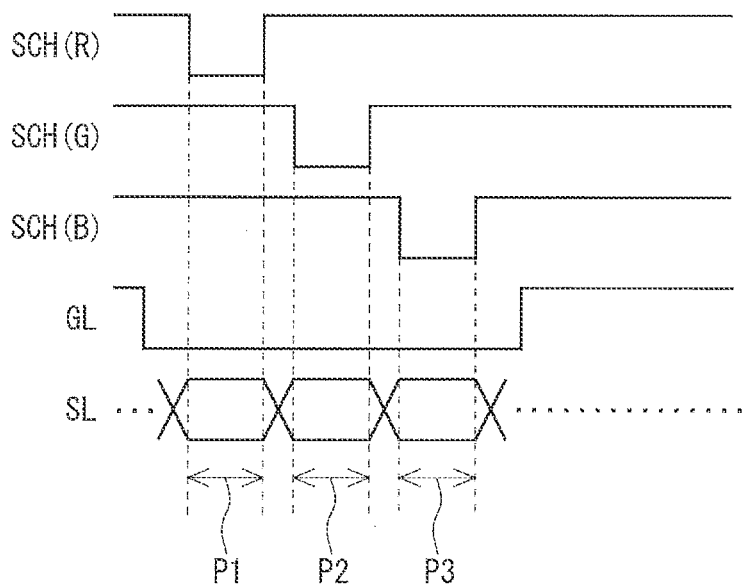
FIG. 8 is a signal waveform diagram for describing the SSD in the first embodiment.

In a configuration such as that described above, as shown in FIG. 7, during a period a bit before a data writing period, the switch 71(R), the switch 71(G), and the switch 71(B) are sequentially turned on for a predetermined period. The source driver 500 outputs a data signal for red during a period P1, outputs a data signal for green during a period P2, and outputs a data signal for blue during a period P3. By this, desired data signals are sequentially supplied to the data signal line SL(R) for red, the data signal line SL(G) for green, and the data signal line SL(B) for blue. Then, with the data signal line SL(R) for red, the data signal line SL(G) for green, and the data signal line SL(B) for blue being charged based on the data signals, writing of the data signals into a pixel circuit for red, a pixel circuit for green, and a pixel circuit for blue is performed during a data writing period. Based on such writing, an image is displayed on the display unit 200. Note that, by sequentially turning on the switch 71(R), the switch 71(G), and the switch 71(B) for a predetermined period during a period during which a scanning signal GL is maintained at a low level as shown in FIG. 6, too, writing of data signals into a pixel circuit for red, a pixel circuit for green, and a pixel circuit for blue is performed so that a desired image is displayed on the display unit 200. Although here description is made using an example in which a data signal outputted from one output portion 51 is distributed to three data signal lines SL, the configuration is not limited thereto. A configuration can be adopted in which with k being an integer greater than or equal to 2, a data signal outputted from one output portion 51 is distributed to k data signal lines SL.

By adopting the SSD such as that described above, the number of data signal lines SL to be disposed in a picture-frame region is reduced, and thus, even if an increase in resolution advances, an increase of the picture-frame region can be suppressed.

1.5 Drive Method for the Organic EL Panel

<1.5.1 Control of the Switches in the Bending Portion>

Figure 9:
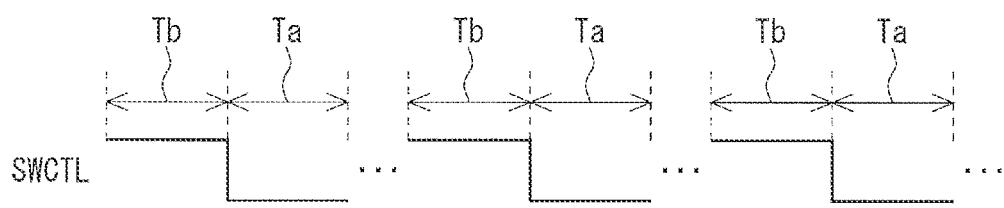
FIG. 9 is a signal waveform diagram for describing on/off control of switches provided in a bending portion in the first embodiment.

FIG. 9 is a signal waveform diagram for describing on/off control of the switches 252 provided in the bending portion 250. Note that a period during which writing of data signals into pixel circuits 20 included in the first display region 210 is performed is hereinafter referred to as "first driving period", and a period during which writing of data signals into pixel circuits 20 included in the second display region 220 is performed is hereinafter referred to as "second driving period" The first driving period is given reference character Ta, and the second driving period is given reference character Tb.

During the second driving period Tb, as shown in FIG. 9, a switch control signal SWCTL is at a high level. Since the switches 252 are p-channel thin-film transistors, the switches 252 are in an off state during the second driving period Tb. By this, the first data signal lines SLa and the second data signal lines SLb go into an electrically disconnected state. In such a state, the source driver 500 applies data signals to the data signal lines SL(1) to SL(J), depending on a target display image for the second display region 220. At this time, wiring loads on the data signal lines SL are smaller than those of an original configuration (a known configuration in which the switches 252 are not provided).

During the first driving period Ta, as shown in FIG. 9, the switch control signal SWCTL is at a low level. Since the switches 252 are p-channel thin-film transistors, the switches 252 are in an on state during the first driving period Ta. By this, the first data signal lines SLa and the second data signal lines SLb go into an electrically connected state. In such a state, the source driver 500 applies data signals to the data signal lines SL(1) to SL(J), depending on a target display image for the first display region 210.

As above, during the second driving period Tb, there is no need to supply data signals to the first data signal lines SLa (data signal lines in the first display region 210), and thus, in order to reduce wiring loads, by bringing the switches 252 into an off state, the first data signal lines SLa and the second data signal lines SLb go into an electrically disconnected state. During the first driving period Ta, data signals need to be supplied to the first data signal lines SLa, and thus, by bringing the switches 252 into an on state, the first data signal lines SLa and the second data signal lines SLb go into an electrically connected state.

<1.5.2 Details>

Figure 10:
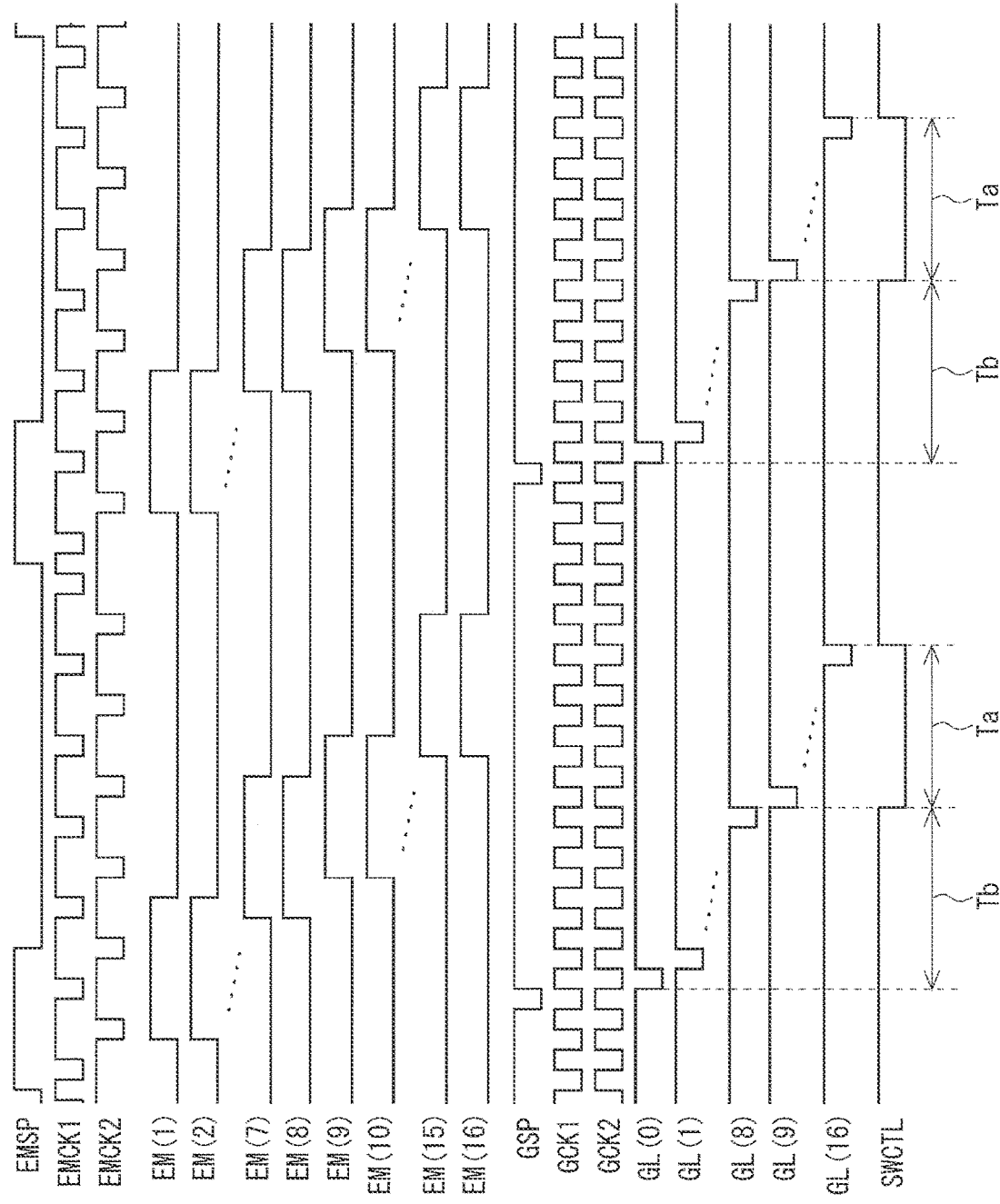
FIG. 10 is a signal waveform diagram for describing details of a drive method of the first embodiment.

FIG. 10 is a signal waveform diagram for describing details of a drive method of the present embodiment. Here, it is assumed that the number of scanning signal lines GL and the number of light emission control lines EM are 16, scanning signal lines GL(1) to GL(8) and light emission control lines EM(1) to EM(8) are disposed in the second display region 220, and scanning signal lines GL(9) to GL(16) and light emission control lines EM(9) to EM(16) are disposed in the first display region 210. Note that in FIG. 10, GL(0) indicates a scanning signal applied to a dummy scanning signal line that does not involve in image display.

Regarding FIG. 10, a period from a given rise time point to a next rise time point of a gate start pulse signal GSP corresponds to one vertical scanning period. In the present embodiment, the potentials of two light emission control lines EM go to a high level during each vertical scanning period, based on emission clock signals EMCK1 and EMCK2. Note, however, that the configuration is not limited thereto, and the potential of one light emission control line EM may go to a high level during the each vertical scanning period. During a period during which the potential of a light emission control line EM is at a high level, a power supply control transistor T5 and a light emission control transistor T6 in a corresponding pixel circuit 20 (see FIG. 4) are in an off state, and thus, an organic EL element 21 is turned off. During a period during which the organic EL element 21 is thus turned off, writing of a data signal into the corresponding pixel circuit 20 is performed.

As can be grasped from FIG. 10, during each vertical scanning period, after the gate start pulse signal GSP is changed from a high level to a low level, scanning signals GL(0) to GL(16) sequentially go to a low level for a predetermined period, based on gate clock signals GCK1 and GCK2.

Here, we focus on a second driving period Tb. During the second driving period Tb, the scanning signals GL(0) to GL(8) sequentially go to a low level for a predetermined period. By this, during the second driving period Tb, writing of data signals into pixel circuits 20 in the second display region 220 is performed. At this time, a switch control signal SWCTL is at a high level. Hence, the switches 252 in the bending portion 250 are in an off state. Thus, the first data signal lines SLa and the second data signal lines SLb are in an electrically disconnected state, and wiring loads on the data signal lines SL are remarkably smaller than those of the original configuration.

Next, we focus on a first driving period Ta. During the first driving period Ta, the scanning signals GL(9) to GL(16) sequentially go to a low level for a predetermined period. By this, during the first driving period Ta, writing of data signals into pixel circuits 20 in the first display region 210 is performed. At this time, the switch control signal SWCTL is at a low level. Hence, the switches 252 in the bending portion 250 are in an on state. Thus, the first data signal lines SLa and the second data signal lines SLb are in an electrically connected state, and data signals are supplied to the first data signal lines SLa from the source driver 500 through the second data signal lines SLb.

Meanwhile, in the present embodiment, in a state in which the organic EL panel 6 is folded, the on/off of the switches 252 is controlled as follows. When an image is displayed in the first display region 210 and an image is not displayed in the second display region 220, the switches 252 are brought into an on state. When an image is displayed in the second display region 220 and an image is not displayed in the first display region 210, the switches 252 are brought into an off state.

Note that although here description is made using an example in which the switches 252 are provided such that the number of scanning signal lines GL disposed in the second display region 220 is equal to the number of scanning signal lines GL disposed in the first display region 210, the configuration is not limited thereto, and the switches 252 may be provided such that the number of scanning signal lines GL disposed in the second display region 220 differs from the number of scanning signal lines GL disposed in the first display region 210.

1.6 Effects

According to the present embodiment, in a bendable (foldable) organic EL display device, there are provided the switches 252 for controlling states of electrical connection between first data signal lines SLs (data signal lines disposed in the first display region 210) and second data signal lines SLb (data signal lines disposed in the second display region 220) in the bending portion 250 in the display unit 200. The on/off of the switches 252 is controlled by a switch control signal SWCTL transmitted from the display control circuit 100. When data signals are written into pixel circuits 20 included in the first display region 210, the switches 252 are turned on, and when data signals are written into pixel circuits 20 included in the second display region 220, the switches 252 are turned off. Meanwhile, in general, power consumption required to charge and discharge data signal lines is proportional to the product of drive frequency, loads (wiring loads) on the data signal lines, the voltage amplitudes of data signals, and the number of the data signal lines. When data signals are written into pixel circuits 20 included in the first display region 210, due to the provision of the switches 252, a wiring load on each data signal line is larger than that of the original configuration. However, when data signals are written into pixel circuits 20 included in the second display region 220, the first data signal lines SLa and the second data signal lines SLb are in an electrically disconnected state, and thus, a wiring load on each data signal line is smaller than that of the original configuration. Power consumption reduced thereby is larger than power consumption that increases with the increase in wiring loads upon writing of data signals into the pixel circuits 20 included in the first display region 210. Thus, power consumption as a whole is reduced compared with that of the known configuration. As above, according to the present embodiment, in the bendable organic EL display device, power consumption can be reduced compared to the known configuration.

In addition, by the reduction in power consumption, the following effects are expected. First, miniaturization of the source driver 500 which is implemented by an LSI, etc., and cost reduction associated therewith are expected. Moreover, in mobile phones, etc., usable hours after charging are extended. Furthermore, since it becomes possible to miniaturize a battery used in a device, flexibility in the design of the device improves, and implementation of appealing designs is expected. Moreover, radiation noise from a display device is reduced. Furthermore, since it becomes possible to maintain drive voltage at a high level, extension of a dynamic range or an increase in the amplitudes of gate control signals GCTL can be achieved.

1.7 Variant

Although two display regions (the first display region 210 and the second display region 220) are provided in the display unit 200 in the above-described first embodiment, the configuration is not limited thereto, and three or more display regions may be provided in the display unit 200. An example in which three display regions (the first display region 210, the second display region 220, and a third display region 230) are provided in the display unit 200 will be described below as a variant of the above-described first embodiment.

Figure 11:
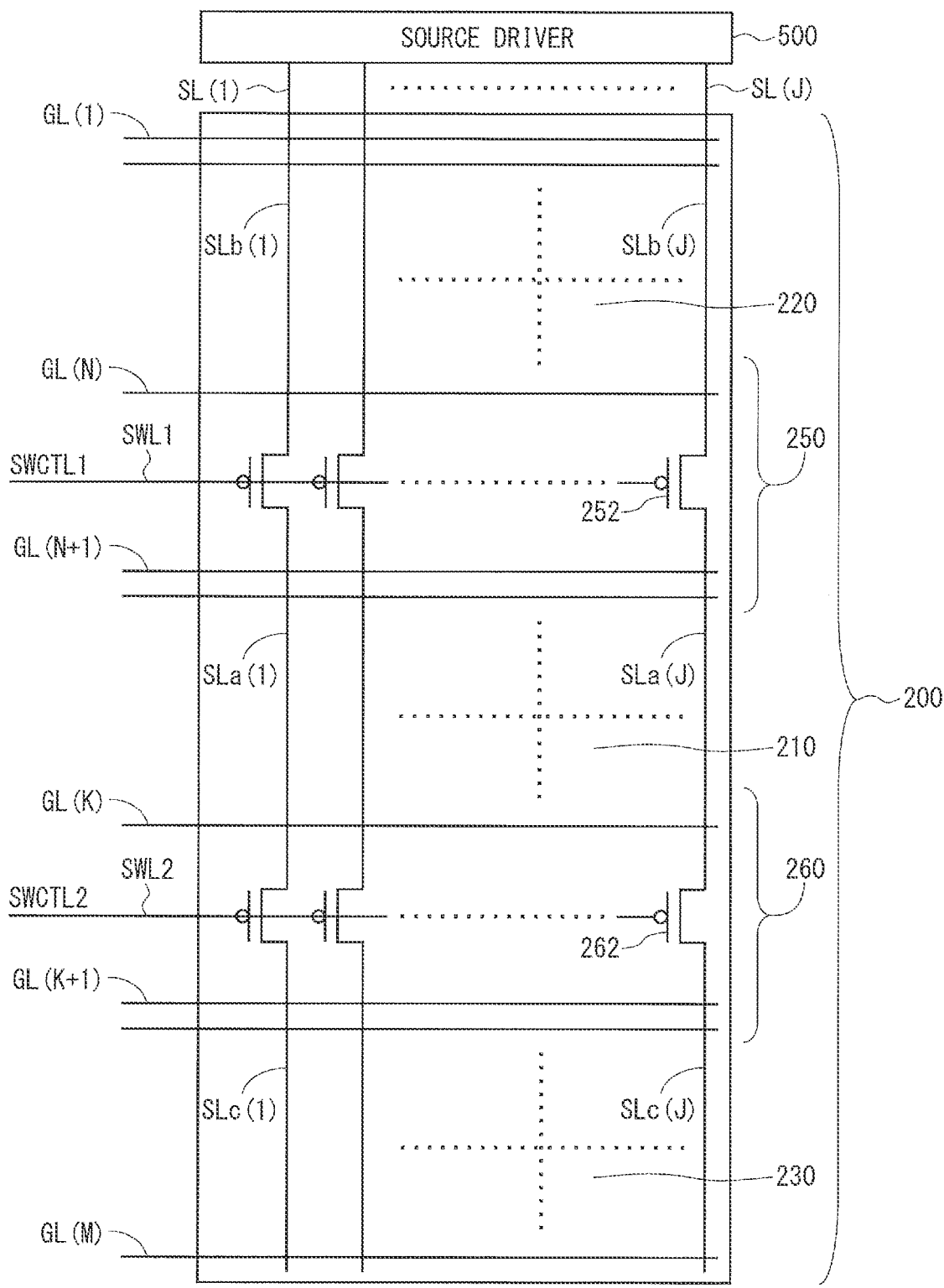
FIG. 11 is a diagram for describing a configuration of a display unit of a variant of the first embodiment.

FIG. 11 is a diagram for describing a configuration of the display unit 200 of the present variant. As described above, in the present variant, the third display region 230 is provided in the display unit 200, in addition to the first display region 210 and the second display region 220. Different images can be displayed in the first display region 210, the second display region 220, and the third display region 230. The third display region 230 is provided on the opposite side to the second display region 220 with respect to the first display region 210. Note that data signal lines disposed in the third display region 230 are referred to as "third data signal lines".

As in the above-described first embodiment, there is provided with a bending portion 250 that straddles the second display region 220 and the first display region 210, and the switches 252 for controlling states of electrical connection between the second data signal lines SLb and the first data signal lines SLa are provided in the bending portion 250. Note that in the present variant, a signal that controls on/off of the switches 252 is referred to as "first switch control signal", and a signal line through which the first switch control signal is transmitted is referred to as "first switching signal line".

In addition, as shown in FIG. 11, there is provided with a connection control part 260 that straddles the first display region 210 and the third display region 230. In the connection control part 260 there is disposed a second switching signal line SWL2 extending in parallel to the M scanning signal lines GL(1) to GL(M) so as to intersect the J data signal lines SL(1) to SL(J). Furthermore, the connection control part 260 includes J switches (analog switches) 262 provided at intersecting portions of the J data signal lines SL(1) to SL(J) and the second switching signal line SWL2. The first data signal lines SLa(1) to SLa(J) and third data signal lines SLc(1) to SLc(J) are connected to each other through their corresponding switches 262. The second switching signal line SWL2 transmits a second switch control signal SWCTL2 that controls on/off of the J switches 262. Each switch 262 is connected at its control terminal to the second switching signal line SWL2, connected at its first conductive terminal to a corresponding third data signal line SLc through a contact hole, and connected at its second conductive terminal to a corresponding first data signal line SLa through a contact hole. By such a configuration, the switch 262 functions to control a state of electrical connection between the third data signal line SLc and the first data signal line SLa. Note that in the present variant, the first switching element is implemented by the switch 252, and the second switching element is implemented by the switch 262.

Figure 12:
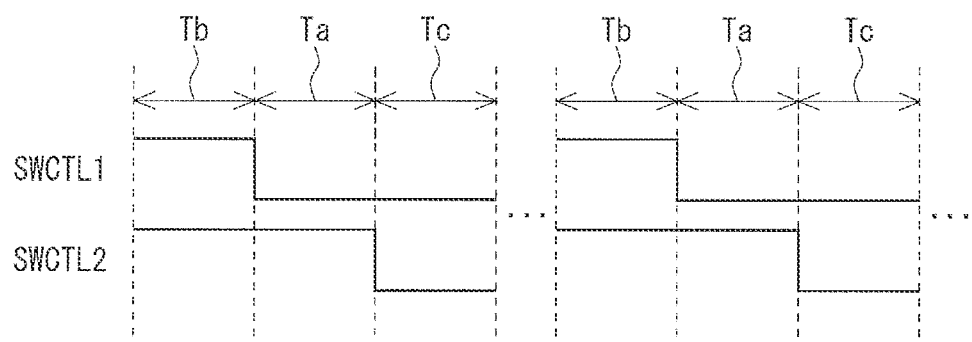
FIG. 12 is a signal waveform diagram for describing on/off control of switches provided in a bending portion and a connection control part in the variant of the first embodiment.

In a configuration such as that described above, as shown in FIG. 12, during a second driving period (a period during which writing of data signals into pixel circuits 20 included in the second display region 220 is performed) Tb, a first switch control signal SWCTL1 is at a high level and a second switch control signal SWCTL2 is at a high level. Hence, the switches 252 are in an off state and the switches 262 are in an off state. By this, the second data signal lines SLb are electrically disconnected from the first data signal lines SLa and the third data signal lines SLc, remarkably reducing wiring loads on the data signal lines SL compared to the original configuration. With the wiring loads on the data signal lines SL thus remarkably reduced compared to the original configuration, data signals are supplied to the second data signal lines SLb from the source driver 500.

Further, during a first driving period (a period during which writing of data signals into pixel circuits 20 included in the first display region 210 is performed) Ta, the first switch control signal SWCTL1 is at a low level and the second switch control signal SWCTL2 is at a high level. Hence, the switches 252 are in an on state and the switches 262 are in an off state. By this, the second data signal lines SLb and the first data signal lines SLa are electrically connected to each other, and the first data signal lines SLa and the third data signal lines SLc go into an electrically disconnected state. As a result, data signals are supplied to the first data signal lines SLa from the source driver 500 through the second data signal lines SLb, with wiring loads on the data signal lines SL being smaller than those of the original configuration.

Furthermore, during a third driving period (a period during which writing of data signals into pixel circuits 20 included in the third display region 230 is performed) Tc, the first switch control signal SWCTL1 is at a low level and the second switch control signal SWCTL2 is at a low level. Hence, the switches 252 are in an on state and the switches 262 are in an on state. By this, the second data signal lines SLb, the first data signal lines SLa, and the third data signal lines SLc go into an electrically connected state, and data signals are supplied to the third data signal lines SLc from the source driver 500 through the second data signal lines SLb and the first data signal lines SLa.

As above, in the present variant, too, in the bendable organic EL display device, power consumption can be reduced compared to the known configuration.

2. Second Embodiment

A second embodiment will be described. Note, however, that the following mainly describes only differences from the first embodiment.

2.1 Configuration

Figure 13:
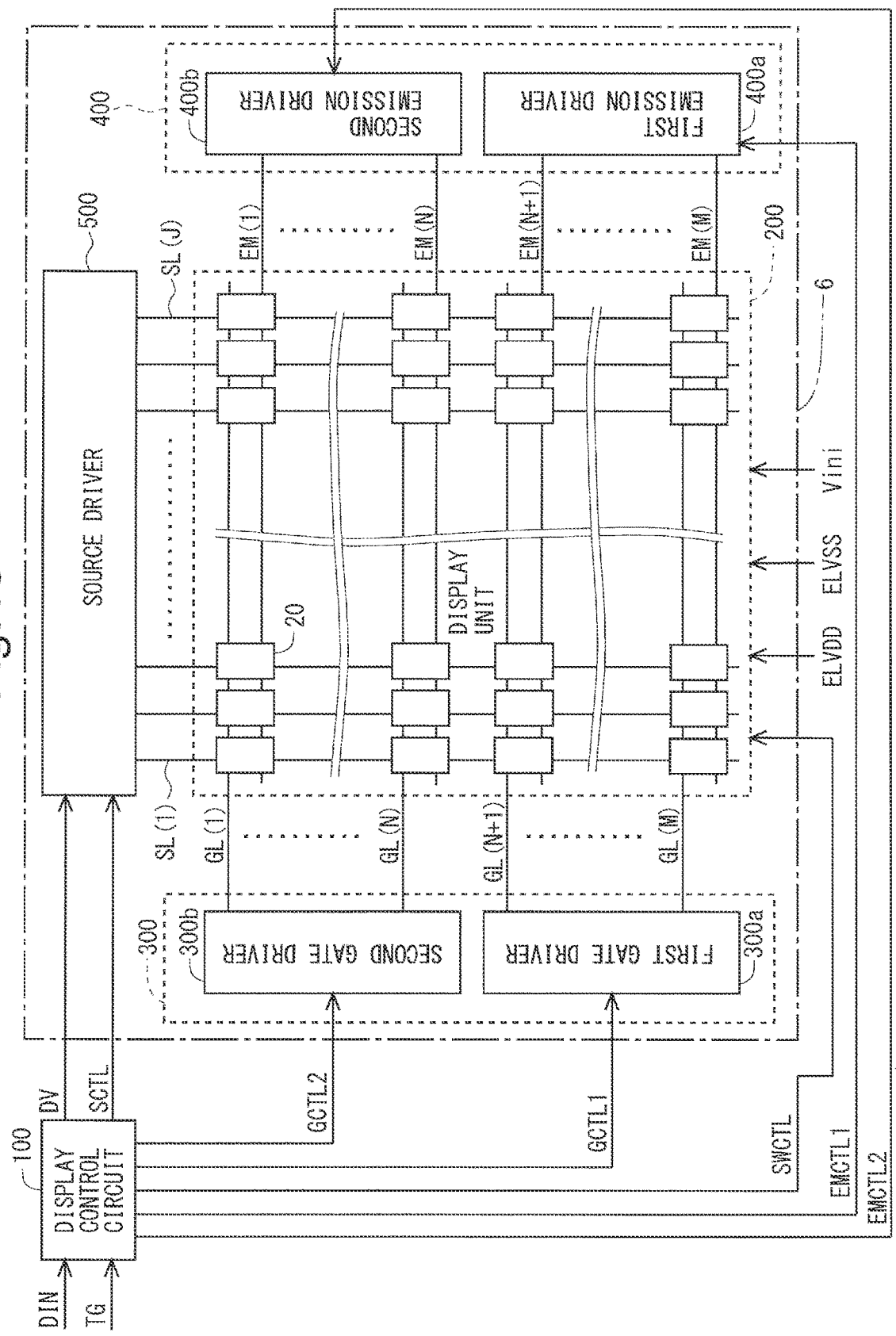
FIG. 13 is a block diagram showing a functional configuration of an organic EL display device according to a second embodiment.

FIG. 13 is a block diagram showing a functional configuration of an organic EL display device according to a second embodiment. In the present embodiment, the gate driver 300 is composed of a first gate driver (first scanning signal line drive circuit) 300a and a second gate driver (second scanning signal line drive circuit) 300b. The emission driver 400 is composed of a first emission driver 400a and a second emission driver 400b. As in the above-described first embodiment, the display unit 200 includes the first display region 210 and the second display region 220 (see FIGS. 1 and 3). The first gate driver 300a drives scanning signal lines GL disposed in the first display region 210, and the second gate driver 300b drives scanning signal lines GL disposed in the second display region 220. The first emission driver 400a drives light emission control lines EM disposed in the first display region 210, and the second emission driver 400b drives light emission control lines EM disposed in the second display region 220.

Meanwhile, in the present embodiment, the second display region 220 is used as a region for main screen display that mainly displays a moving image, and the first display region 210 is used as a region for auxiliary screen display that mainly displays a still image (e.g., an image of a keyboard).

In regard to driving of the organic EL panel 6, the organic EL display device according to the present embodiment has a first mode in which drive frequency is a first frequency and a second mode in which drive frequency is a second frequency higher than the first frequency. Since the first display region 210 mainly displays a still image, the first display region 210 is driven with the first mode. Since the second display region 220 mainly displays a moving image, the second display region 220 is driven with the second mode. That is, a region far from the source driver 500 is driven at a relatively low frequency, and a region close to the source driver 500 is driven at a relatively high frequency.

Further, as in the first embodiment, when data signals are written into pixel circuits 20 in the first display region 210, the switches 252 are brought into an on state, and when data signals are written into pixel circuits 20 in the second display region 220, the switches 252 are brought into an off state. In other words, writing of data signals into pixel circuits 20 in the first display region 210 is performed with the switches 252 turned on, and writing of data signals into pixel circuits 20 in the second display region 220 is performed with the switches 252 turned off. Thus, wiring loads upon writing of data signals into pixel circuits 20 in the second display region 220 are, as in the first embodiment, smaller than those of the original configuration. Note that although here description is made using an example in which the source driver 500 is provided on an upper edge side of the organic EL panel 6 (see FIG. 13), the source driver 500 may be provided on a lower edge side of the organic EL panel 6. In this case, it is preferred that the second display region (a region that mainly displays a moving image) 220 be arranged on a lower side (a side close to the source driver 500) than the first display region (a region that mainly displays a still image) 210.

2.2 Drive Method for the Organic EL Panel

Figure 14:
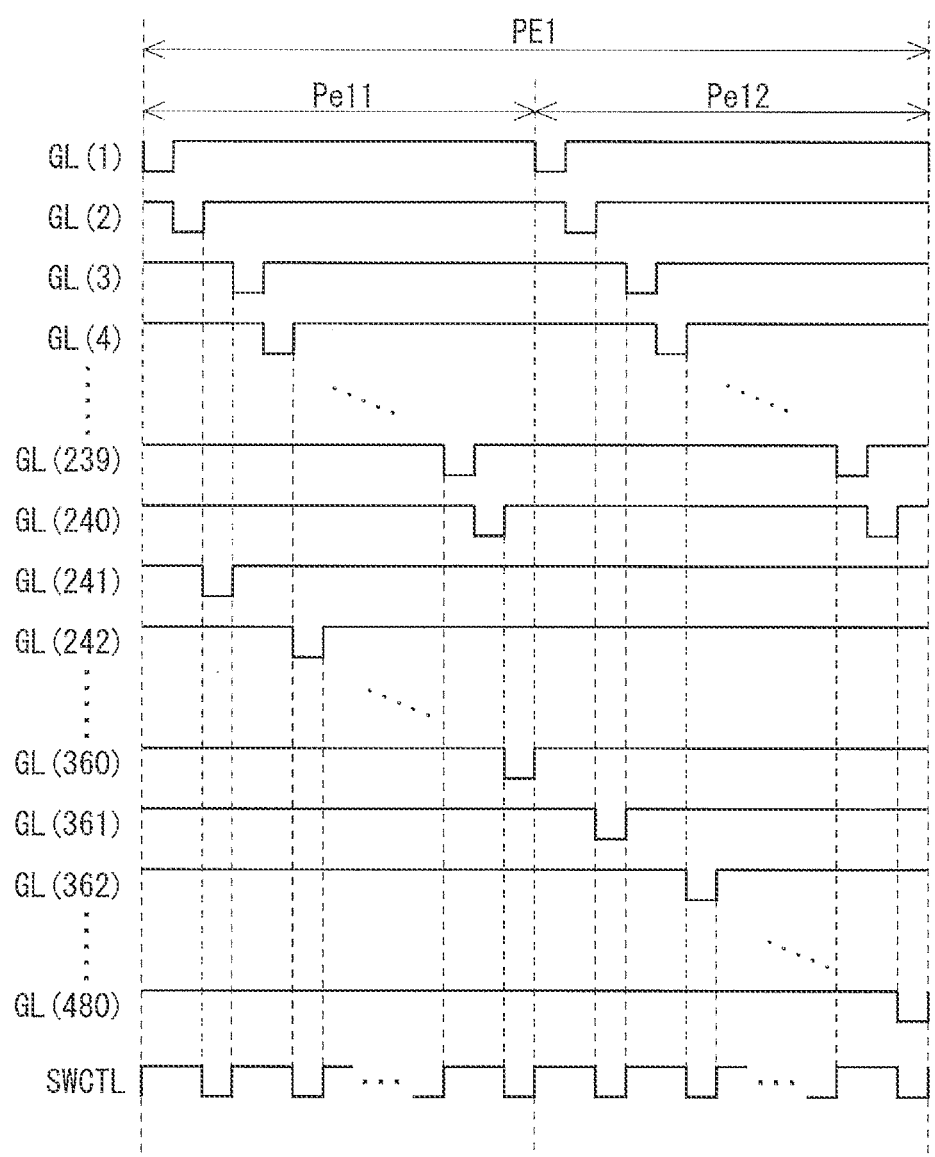
FIG. 14 is a signal waveform diagram for describing a drive method of the second embodiment.

With reference to FIG. 14, a drive method of the present embodiment will be described. Here, it is assumed that the number of scanning signal lines GL is 480, scanning signal lines GL(1) to GL(240) are disposed in the second display region 220, and scanning signal lines GL(241) to GL(480) are disposed in the first display region 210. Scanning signal lines disposed in the second display region 220 are hereinafter referred to as "second scanning signal lines", and scanning signal lines disposed in the first display region 210 are hereinafter referred to as "first scanning signal lines". Note that scanning signals applied to the second scanning signal lines are referred to as "second scanning signals", and scanning signals applied to the first scanning signal lines are referred to as "first scanning signals".

In FIG. 14, we focus on a period Pe11. First, two second scanning signal lines GL(1) and GL(2) are sequentially driven by the second gate driver 300*b*, and thereafter, one first scanning signal line GL(241) is driven by the first gate driver 300*a*. Then, two second scanning signal lines GL(3) and GL(4) are sequentially driven by the second gate driver 300*b*, and thereafter, one first scanning signal line GL(242) is driven by the first gate driver 300*a*. After repeating similar operation, two second scanning signal lines GL(239) and GL(240) are sequentially driven by the second gate driver 300*b*, and thereafter, one first scanning signal line GL(360) is driven by the first gate driver 300*a*.

During a period Pe12, the second scanning signal lines GL(1) to GL(240) are driven in the same manner as during the period Pe11. Regarding the first scanning signal lines GL(241) to GL(480), as shown in FIG. 14, during the period Pe12, the first scanning signal lines GL(361) to GL(480) are driven one by one.

As above, during a period PE1, in the second display region 220, vertical scanning is performed twice, whereas in the first display region 210, vertical scanning is performed only once. That is, the drive frequency (second frequency) for the second display region 220 is twice the drive frequency (first frequency) for the first display region 210.

Note that a gate start pulse signal and a gate clock signal whose waveforms are adjusted as appropriate are provided as first gate control signals GCTL1 and second gate control signals GCTL2 to the first gate driver 300*a* and the second gate driver 300*b* respectively from the display control circuit 100 so as to drive the first scanning signal lines GL(241) to GL(480) and the second scanning signal lines GL(1) to GL(240) in the above-described manner.

Regarding FIG. 14, during a period during which any of the second scanning signals GL(1) to GL(240) is at a low level, writing of data signals into pixel circuits 20 included in the second display region 220 is performed, and during a period during which any of the first scanning signals GL(241) to GL(480) is at a low level, writing of data signals into pixel circuits 20 included in the first display region 210 is performed. Here, when the waveform of a switch control signal SWCTL is taken a look at, as in the first embodiment, during a period during which writing of data signals into pixel circuits 20 included in the second display region 220 is performed, the switch control signal SWCTL is at a high level, and during a period during which writing of data signals into pixel circuits 20 included in the first display region 210 is performed, the switch control signal SWCTL is at a low level. Thus, during the period during which writing of data signals into pixel circuits 20 included in the second display region 220 is performed, the switches 252 in the bending portion 250 are in an off state, and during the period during which writing of data signals into pixel circuits 20 included in the first display region 210 is performed, the switches 252 in the bending portion 250 are in an on state.

From the above, when writing of data signals into pixel circuits 20 in the second display region 220 is performed, the first data signal lines SLa and the second data signal lines SLb go into an electrically disconnected state (see FIG. 1), remarkably reducing wiring loads on the data signal lines SL compared to the original configuration. With the wiring loads on the data signal lines SL thus remarkably reduced compared to the original configuration, data signals are supplied to the second data signal lines SLb from the source driver 500.

When writing of data signals into pixel circuits 20 in the first display region 210 is performed, the first data signal lines SLa and the second data signal lines SLb go into an electrically connected state, and data signals are supplied to the first data signal lines SLa from the source driver 500 through the second data signal lines SLb.

Figure 15:
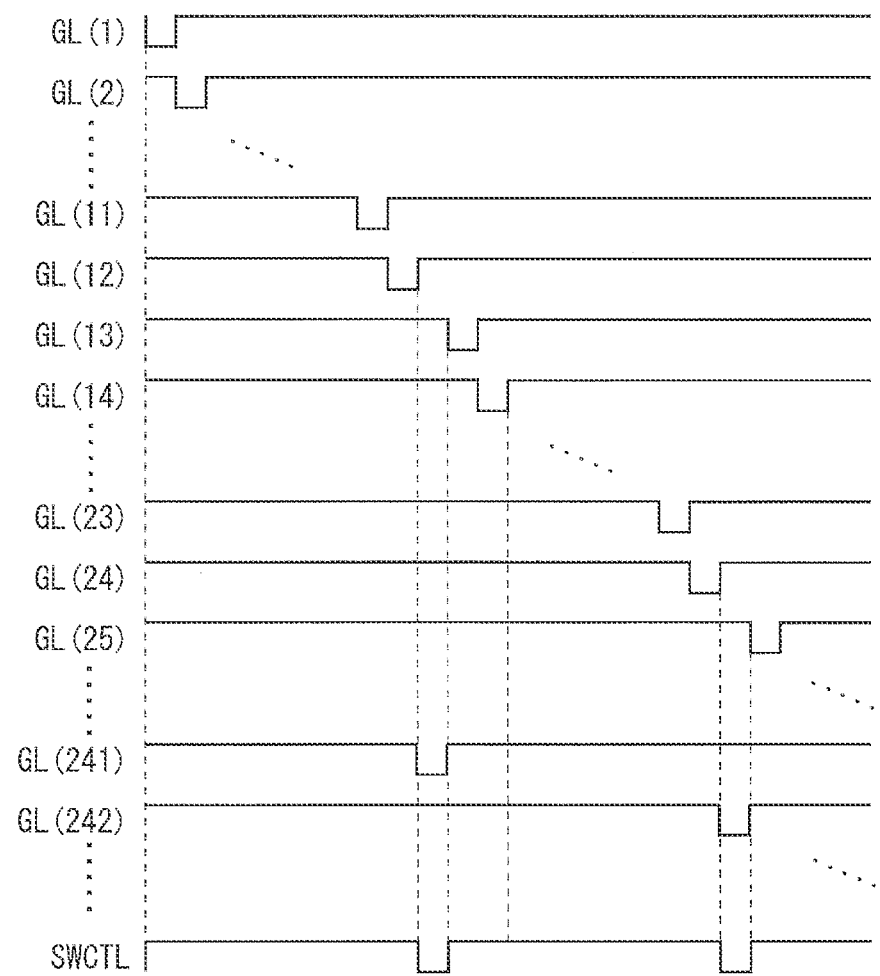
FIG. 15 is a signal waveform diagram for describing another example of a drive method of the second embodiment.

Note that although here description is made using an example in which the operation of "driving two second scanning signal lines and driving one first scanning signal line" is repeated, the configuration is not limited thereto. For example, as shown in FIG. 15, the operation of "driving 12 second scanning signal lines and driving one first scanning signal line" may be repeated. In this case, for example, the drive frequency for the second display region 220 is 120 Hz, and the drive frequency for the first display region 210 is 10 Hz. In addition, for example, the drive frequency for the second display region 220 may be 110.77 Hz (120×12/13=about 110.77), and the drive frequency for the first display region 210 may be 9.23 Hz(120×1/13=about 9.23).

When it is generalized, in a case in which the number of second scanning signal lines that are driven consecutively is represented by L, driving by the gate driver 300 may be performed as follows. The gate driver 300 sequentially drives, during consecutive (2L+2) horizontal scanning periods, second scanning signal lines from a Pth row to a (P+L−1)th row, a first scanning signal line in a Qth row, second scanning signal lines from a (P+L)th row to a (P+2L−1)th row, and a first scanning signal line in a (Q+1)th row. Here, all scanning signal lines correspond to the first row to an Mth row, the second scanning signal lines correspond to the first row to an Nth row, the first scanning signal lines correspond to an (N+1)th row to the Mth row, L is an integer greater than or equal to 1, P is an integer between 1 and (N−2L+1), inclusive, and Q is an integer between (N+1) and (M−1), inclusive.

2.3 Effects

According to the present embodiment, as in the above-described first embodiment, wiring loads on the data signal lines SL upon writing data signals into pixel circuits 20 included in the second display region 220 are smaller than those of the original configuration (the known configuration in which the switches 252 are not provided). The second display region 220 is used as a region for main screen display, and is driven at a higher frequency than that for the first display region 210. Thus, as can be grasped from FIGS. 14 and 15, during many of periods during which writing of data signals into pixel circuits 20 is performed, wiring loads on the data signal lines SL are being smaller than those of the original configuration. As a result, power consumption is significantly reduced compared with that of the known configuration. As above, according to the present embodiment, in the bendable organic EL display device, power consumption can be remarkably reduced compared to the known configuration.

2.4 Variants

Variants of the above-described second embodiment will be described below.

<2.4.1 First Variant>

Figure 16:
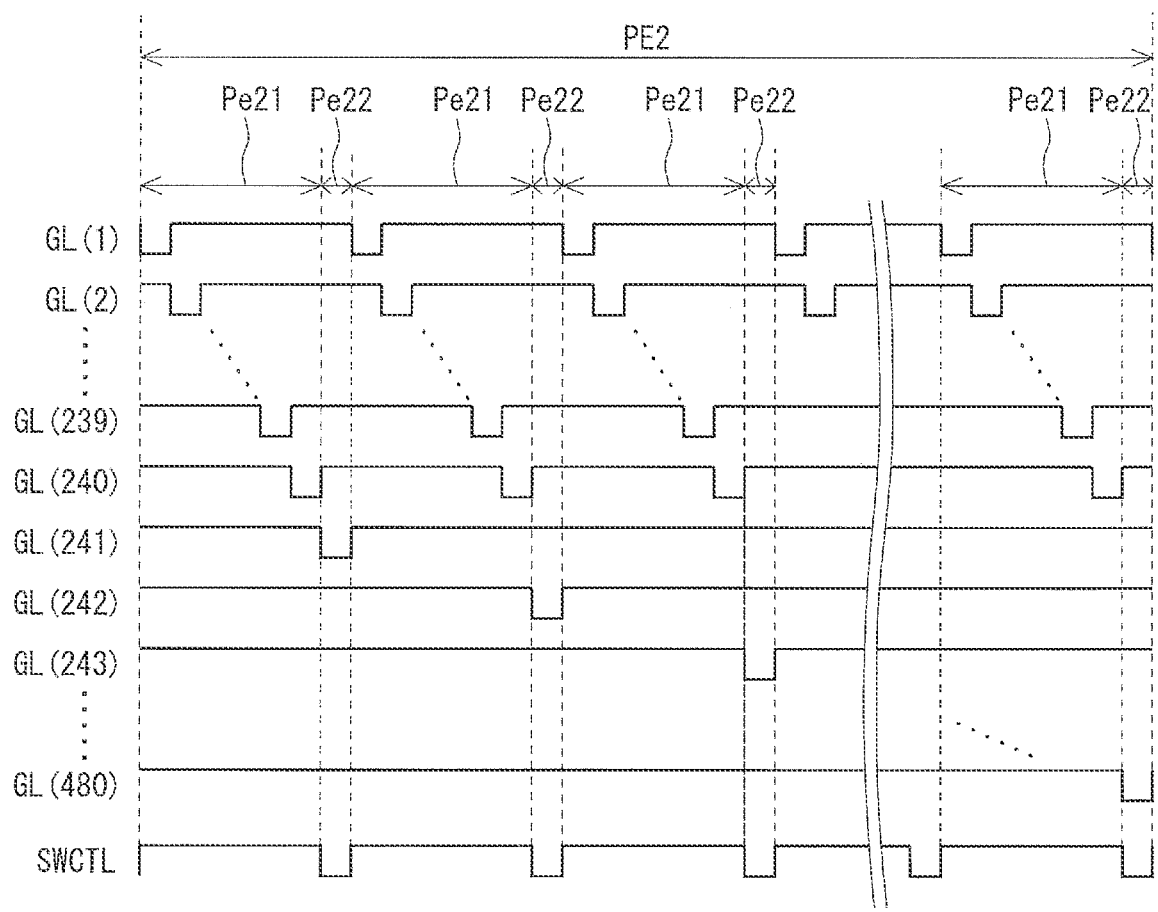
FIG. 16 is a signal waveform diagram for describing a drive method of a first variant of the second embodiment.

FIG. 16 is a signal waveform diagram for describing a drive method of the present variant. Note that in this variant, too, it is assumed that the number of scanning signal lines GL is 480, second scanning signal lines GL(1) to GL(240) are disposed in the second display region 220, and first scanning signal lines GL(241) to GL(480) are disposed in the first display region 210.

Regarding FIG. 16, during a period Pe21, the 240 second scanning signal lines GL(1) to GL(240) are sequentially driven one by one, and during a period Pe22, one of the first scanning signal lines GL(241) to GL(480) is driven.

Specifically, driving by the gate driver 300 is performed as follows. First, the 240 second scanning signal lines GL(1) to GL(240) are sequentially driven by the second gate driver 300b, and thereafter, one first scanning signal line GL(241) is driven by the first gate driver 300a. Then, the 240 second scanning signal lines GL(1) to GL(240) are sequentially driven by the second gate driver 300b, and thereafter, one first scanning signal line GL(242) is driven by the first gate driver 300a. After repeating similar operation, the 240 second scanning signal lines GL(1) to GL(240) are sequentially driven by the second gate driver 300b, and thereafter, one first scanning signal line GL(480) is driven by the first gate driver 300a.

In the above-described manner, during a period PE2, in the second display region 220, vertical scanning is performed 240 times, whereas in the first display region 210, vertical scanning is performed only once. That is, in this example, the drive frequency (second frequency) for the second display region 220 is 240 times the drive frequency (first frequency) for the first display region 210.

In the present variant, too, during a period during which any of the second scanning signals GL(1) to GL(240) is at a low level (i.e., a period during which writing of data signals into pixel circuits 20 included in the second display region 220 is performed), the switch control signal SWCTL is at a high level, and during a period during which any of the first scanning signals GL(241) to GL(480) is at a low level (i.e., a period during which writing of data signals into pixel circuits 20 included in the first display region 210 is performed), the switch control signal SWCTL is at a low level. Thus, during the period during which writing of data signals into pixel circuits 20 included in the second display region 220 is performed, the switches 252 in the bending portion 250 are in an off state, and during the period during which writing of data signals into pixel circuits 20 included in the first display region 210 is performed, the switches 252 in the bending portion 250 are in an on state.

As above, in the present variant, the gate driver 300 repeats a driving cycle in which "all of the second scanning signal lines GL(1) to GL(240) are sequentially driven with the switches 252 turned off, and furthermore, one of the first scanning signal lines GL(241) to GL(480) is driven with the switches 252 turned on". In two consecutive driving cycles, in a subsequent driving cycle, the gate driver 300 drives a first scanning signal line corresponding to a next row of a first scanning signal line driven in a preceding driving cycle.

According to the present variant, writing of data signals into pixel circuits 20 included in the second display region 220 is performed with wiring loads on the data signal lines SL being remarkably smaller than those of the original configuration. In addition, as can be grasped from FIG. 16, during most of periods during which writing of data signals into pixel circuits 20 is performed, wiring loads on the data signal lines SL are being smaller than those of the original configuration. From the above, power consumption is significantly reduced compared to the known configuration.

<2.4.2 Second Variant>

Figure 17:
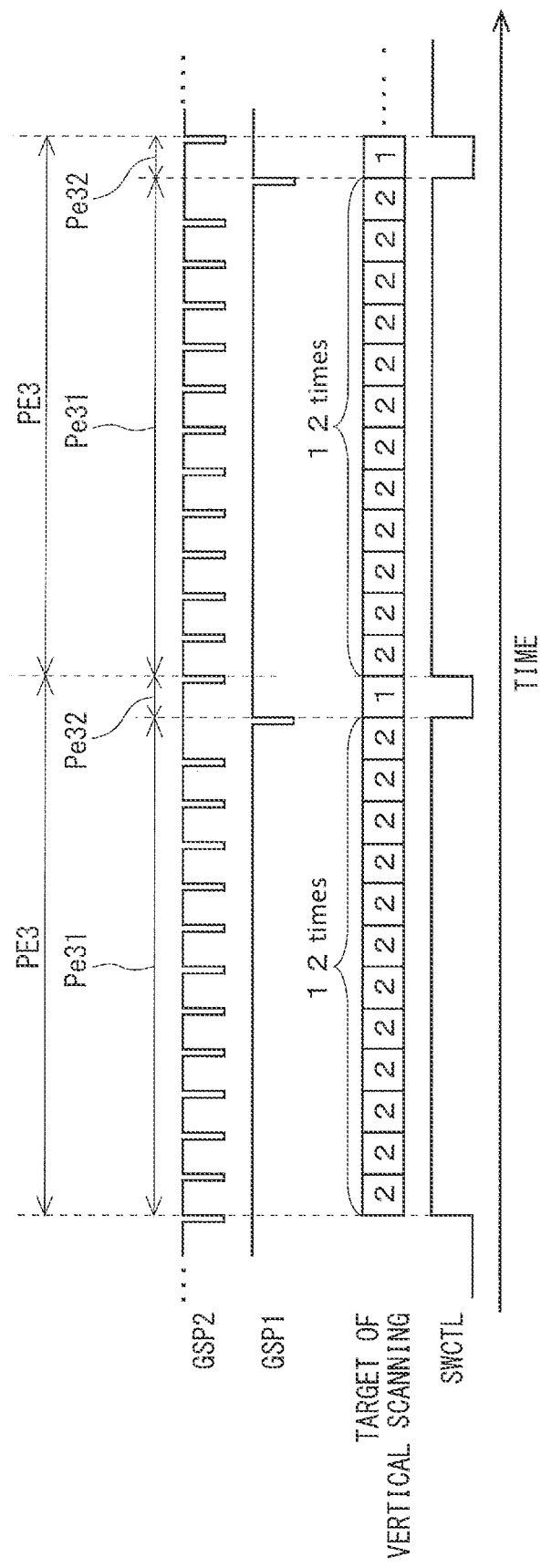
FIG. 17 is a signal waveform diagram for describing a drive method of a second variant of the second embodiment.

FIG. 17 is a signal waveform diagram for describing a drive method of the present variant. Note that, regarding a line that reads "target of vertical scanning" in FIG. 17, "2" indicates that the target of vertical scanning is the second display region 220, and "1" indicates that the target of vertical scanning is the first display region 210 (which is also applied to FIG. 18). A second gate start pulse signal GSP2 is a signal that instructs a start of vertical scanning in the second display region 220 (operation of sequentially driving all of the second scanning signal lines), and is provided to the second gate driver 300b, as one of second gate control signals GCTL2 (see FIG. 13). A first gate start pulse signal GSP1 is a signal that instructs a start of vertical scanning in the first display region 210 (operation of sequentially driving all of the first scanning signal lines), and is provided to the first gate driver 300a, as one of first gate control signals GCTL1 (see FIG. 13). Note that a second start pulse signal is implemented by the second gate start pulse signal GSP2 and a first start pulse signal is implemented by the first gate start pulse signal GSP1.

As shown in FIG. 17, during a period Pe31, vertical scanning in the second display region 220 is repeated 12 times. During a period Pe32 following the period Pe31, vertical scanning in the first display region 210 is performed only once. Operation such as that described above is repeated. By this, during a period PE3, in the second display region 220, vertical scanning is performed 12 times, whereas in the first display region 210, vertical scanning is performed only once. That is, the drive frequency (second frequency) for the second display region 220 is 12 times the drive frequency (first frequency) for the first display region 210. For example, the drive frequency for the second display region 220 is 120 Hz, and the drive frequency for the first display region 210 is 10 Hz. In addition, for example, the drive frequency for the second display region 220 may be 110.77 Hz (120×12/13=about 110.77), and the drive frequency for the first display region 210 may be 9.23 Hz(120× 1/13=about 9.23).

A switch control signal SWCTL is at a high level during the period Pe31 and is at a low level during the period Pe32. That is, during a period during which writing of data signals into pixel circuits 20 included in the second display region 220 is performed, the switch control signal SWCTL is at a high level, and during a period during which writing of data signals into pixel circuits 20 included in the first display region 210 is performed, the switch control signal SWCTL is at a low level. Thus, during the period during which writing of data signals into pixel circuits 20 included in the second display region 220 is performed, the switches 252 in the bending portion 250 are in an off state, and during the period during which writing of data signals into pixel circuits 20 included in the first display region 210 is performed, the switches 252 in the bending portion 250 are in an on state.

As above, in the present variant, the gate driver 300 repeats driving of ail of the second scanning signal lines 12 times with the switches 252 turned off, and thereafter drives all of the first scanning signal lines only once with the switches 252 turned on.

In the present variant, too, in the bendable organic EL display device, power consumption can be remarkably reduced compared to the known configuration.

<2.4.3 Third Variant>

Figure 18:
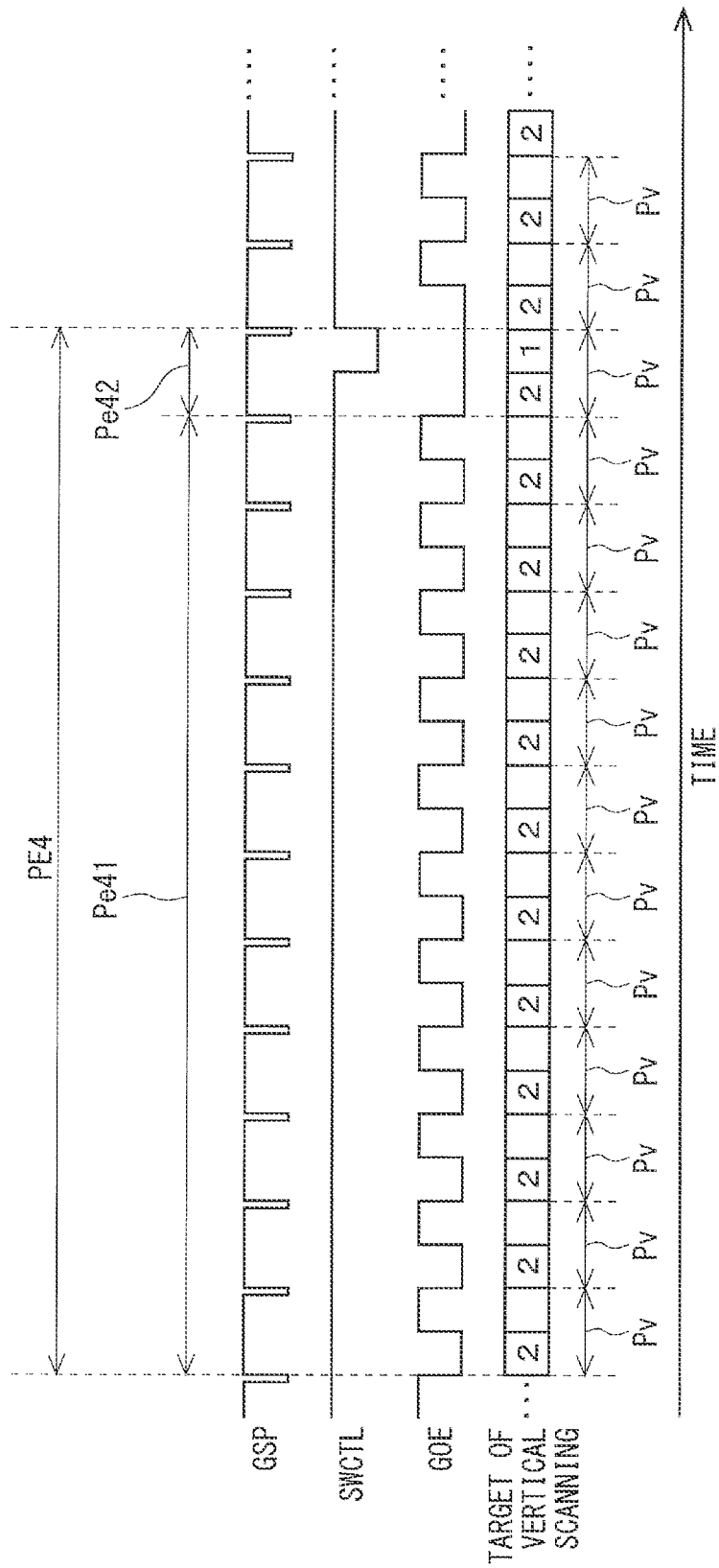
FIG. 18 is a signal waveform diagram for describing a drive method of a third variant of the second embodiment.

FIG. 18 is a signal waveform diagram for describing a drive method of the present variant. Note that in the present variant, too, it is assumed that the number of scanning signal lines GL is 430, second scanning signal lines GL(1) to GL(240) are disposed in the second display region 220, and first scanning signal lines GL(241) to GL(480) are disposed in the first display region 210.

In the present variant, only one gate start pulse signal GSP is used. Further, in the present variant, an enable signal GOE that performs control as to whether to allow driving of the scanning signal lines GL is provided to the gate driver 300 from the display control circuit 100. The gate driver 300 is configured to be able to drive the scanning signal lines GL only when the enable signal GOE is at an on level (a low level in the present variant).

A period from a given rise time point to a next rise time point of the gate start pulse signal GSP corresponds to a vertical scanning period Pv for the entire display unit 200. During each vertical scanning period Pv, a shift register included in the gate driver 300 performs shift operation on a stage corresponding to the second scanning signal line GL(1) to a stage corresponding to the first scanning signal line GL(480), based on a gate clock signal and using the gate start pulse signal GSP as a trigger. Accordingly, if the enable signal GOE is not used, then during each vertical scanning period Pv, the second scanning signal lines GL(1) to GL(240) and the first scanning signal lines GL(241) to GL(480) are sequentially driven. However, since the enable signal GOE is used as described above in the present variant, the second scanning signal lines GL(1) to GL(240) and the first scanning signal lines GL(241) to GL(480) are driven as follows.

Regarding each vertical scanning period Pv during a period Pe41, the enable signal GOE is maintained at an on level (low level) during the first half period, and maintained at an off level (high level) during the second half period. Thus, during the first half period of each vertical scanning period Pv, the second scanning signal lines GL(1) to GL(240) are sequentially driven (i.e., vertical scanning in the second display region 220 is performed), and during the second half period of each vertical scanning period Pv, none of the scanning signal lines GL are driven. Such operation is repeated 11 times during the period Pe41.

Regarding a vertical scanning period Pv during a period Pe42, the enable signal GOE is maintained at an on level (low level) during both the first half period and the second half period. Thus, during the first half period of the vertical scanning period Pv, the second scanning signal lines GL(1) to GL(240) are sequentially driven, and during the second half period of the vertical scanning period Pv, the first scanning signal lines GL(241) to GL(480) are sequentially driven.

From the above, during a period PE4, in the second display region 220, vertical scanning is performed 12 times, whereas in the first display region 210, vertical scanning is performed only once. That is, as in the above-described second variant, the drive frequency (second frequency) for the second display region 220 is 12 times the drive frequency (first frequency) for the first display region 210. For example, the drive frequency for the second display region 220 is 120 Hz, and the drive frequency for the first display region 210 is 10 Hz. In addition, for example, the drive frequency for the second display region 220 may be 110.77 Hz (120×12/13=about 110.77), and the drive frequency for the first display region 210 may be 9.23 Hz(120×1/13=about 9.23).

A switch control signal SWCTL is at a low level only during a period during which vertical scanning is performed in the first display region 210, and is at a high level during other periods. Thus, during a period during which writing of data signals into pixel circuits 20 included in the second display region 220 is performed, the switches 252 in the bending portion 250 are in an off state, and during a period during which writing of data signals into pixel circuits 20 included in the first display region 210 is performed, the switches 252 in the bending portion 250 are in an on state.

As above, in the present variant, as in the second variant, the gate driver 300 repeats driving of ail of the second scanning signal lines 12 times with the switches 252 turned off, and thereafter drives all of the first scanning signal lines only once with the switches 252 turned on. In addition, regarding 12 consecutive vertical scanning periods Pv, in the first to eleventh vertical scanning periods Pv, the display control circuit 100 maintains the enable signal GOE at an on level only during periods during which the second scanning signal lines GL(1) to GL(240) are to be driven, and in the twelfth vertical scanning period Pv, the display control circuit 100 maintains the enable signal GOE at an on level during both of a period during which the second scanning signal lines GL(1) to GL(240) are to be driven and a period during which the first scanning signal lines GL(241) to GL(480) are to be driven.

In the present variant, too, in the bendable organic EL display device, power consumption can be remarkably reduced compared to the known configuration.

Note that although here description is made using, as an example, a case in which vertical scanning is performed 12 times in the second display region 220 during the above-described period PE4, the configuration is not limited thereto. For a case in which with Z being an integer greater than or equal to 2, vertical scanning is performed Z times in the second display region 220 during the above-described period PE4, the same drive method as that described above can be adopted That is, the configuration may be such that, for Z consecutive vertical scanning periods (Z is an integer greater than or equal to 2), in the first to (Z−1)th vertical scanning periods, the enable signal is maintained at an on level only during periods during which the second scanning signal lines are to be driven, and in a Zth vertical scanning period, the enable signal is maintained at an on level during both of a period during which the second scanning signal lines are to be driven and a period during which the first scanning signal lines are to be driven.

3. Others

Although description is made using an organic EL display device as an example in each of the above-described embodiments (including the variants), the configuration is not limited thereto. The present disclosure can also be applied to liquid crystal display devices, inorganic EL display devices, QLED display devices, etc., as long as the devices are configured to include scanning signal lines and data signal lines and to be bendable. In addition, the present disclosure can also be applied to display devices used for virtual reality (VR).

DESCRIPTION OF REFERENCE CHARACTERS

6: ORGANIC EL DISPLAY PANEL
20: PIXEL CIRCUIT
21: ORGANIC EL ELEMENT
60: PICTURE-FRAME REGION
100: DISPLAY CONTROL CIRCUIT
200: DISPLAY UNIT
210: FIRST DISPLAY REGION
220: SECOND DISPLAY REGION
230: THIRD DISPLAY REGION
250: BENDING PORTION
252: SWITCH IN THE BENDING PORTION
260: CONNECTION CONTROL PART
262: SWITCH IN THE CONNECTION CONTROL PART
300: GATE DRIVER (SCANNING SIGNAL LINE DRIVE CIRCUIT)
400: EMISSION DRIVER
500: SOURCE DRIVER
SL, SL(1) to SL(J): DATA SIGNAL MINE
SLa, SLa(1) to SLa(J): FIRST DATA SIGNAL LINE
SLb, SLb(1) to SLb(J): SECOND DATA SIGNAL LINE
SLc, SLc(1) to SLc(J): THIRD DATA SIGNAL LINE

The invention claimed is:

1. A display device that is foldable and displays an image by writing a data signal into a plurality of pixel circuits arranged in a display panel, wherein
the display panel includes:
a plurality of data signal lines configured to transmit the data signal;
a plurality of scanning signal lines intersecting the plurality of data signal lines;
the plurality of pixel circuits provided at intersecting portions of the plurality of data signal lines and the plurality of scanning signal lines;
a first display region and a second display region in which the plurality of data signal lines are disposed;
a picture-frame region that encloses the first display region and the second display region;
a data signal line drive circuit configured to apply the data signal to the plurality of data signal lines; and
a scanning signal line drive circuit configured to drive the plurality of scanning signal lines,
the first display region and the second display region are arranged side by side in a direction in which the plurality of data signal lines extend,
the data signal line drive circuit is provided in a region in the picture-frame region so that the data signal is applied to data signal lines disposed in the second display region earlier than data signal lines disposed in the first display region, the region in the picture-frame region being closer to the second display region than to the first display region, and
the display panel further includes:
a first switching signal line disposed between the first display region and the second display region, the first switching signal line extending in parallel to the plurality of scanning signal lines so as to intersect the plurality of data signal lines; and
a plurality of first switching elements provided at intersecting portions of the plurality of data signal lines and the first switching signal line, the plurality of first switching elements each having a control terminal connected to the first switching signal line, a first conductive terminal connected to a data signal line disposed in the first display region, and a second conductive terminal connected to a data signal line disposed in the second display region.

2. The display device according to claim 1, wherein a bending portion that straddles the first display region and the second display region overlaps the plurality of first switching elements.

3. The display device according to claim 1, wherein
each of the plurality of data signal lines includes a first data signal line disposed in the first display region, and a second data signal line disposed in the second display region, and
the first data signal line and the second data signal line are connected to each other through a corresponding first switching element.

4. The display device according to claim 3, wherein
the first conductive terminal of each of the plurality of first switching elements is electrically connected to a corresponding data signal line through a contact hole, and
the second conductive terminal of each of the plurality of first switching elements is electrically connected to a corresponding data signal line through a contact hole.

5. The display device according to claim 1, wherein semiconductor layers of the plurality of first switching elements are formed in a same layer as semiconductor layers that form the plurality of pixel circuits, and using a same material as the semiconductor layers that form the plurality of pixel circuits.

6. The display device according to claim 1, wherein the display panel further includes:
a third display region provided on an opposite side to the second display region with respect to the first display region;
a second switching signal line disposed between the first display region and the third display region, the second switching signal line extending in parallel to the plurality of scanning signal lines so as to intersect the plurality of data signal lines;
a plurality of second switching elements provided at intersecting portions of the plurality of data signal lines and the second switching signal line, the plurality of second switching elements each having a control terminal connected to the second switching signal line, a first conductive terminal connected to a data signal line disposed in the third display region, and a second conductive terminal connected to a data signal line disposed in the first display region.

7. The display device according to claim 1, wherein writing of the data signal into pixel circuits included in the first display region among the plurality of pixel circuits is performed with the plurality of first switching elements turned on, and
writing of the data signal into pixel circuits included in the second display region among the plurality of pixel circuits is performed with the plurality of first switching elements turned off.

8. The display device according to claim 7, wherein when an image is displayed in the first display region and an image is not displayed in the second display region, the plurality of first switching elements are turned on, and
when an image is displayed in the second display region and an image is not displayed in the first display region, the plurality of first switching elements are turned off.

9. The display device according to claim 1, wherein the display panel includes k third switching elements per output portion of the data signal line drive circuit, wherein k is an integer greater than or equal to 2,
each output portion of the data signal line drive circuit is connected to k data signal lines through the k third switching elements, and
by the k third switching elements sequentially turned on, each data signal outputted from the data signal line drive circuit is distributed to the k data signal lines.

10. The display device according to claim 1, wherein the display device has a first mode in which drive frequency is a first frequency, and a second mode in which drive frequency is a second frequency higher than the first frequency,
the first display region is driven in the first mode, and writing of the data signal into pixel circuits included in the first display region among the plurality of pixel circuits is performed with the plurality of first switching elements turned on, and
the second display region is driven in the second mode, and writing of the data signal into pixel circuits included in the second display region among the plurality of pixel circuits is performed with the plurality of first switching elements turned off.

11. The display device according to claim 1, wherein the plurality of scanning signal lines include a plurality of first scanning signal lines disposed in the first display region and a plurality of second scanning signal lines disposed in the second display region, and
plural second scanning signal lines are driven between driving of a first scanning signal line and driving of an adjacent first scanning signal line.

12. The display device according to claim 1, wherein the plurality of scanning signal lines include a plurality of first scanning signal lines disposed in the first display region and a plurality of second scanning signal lines disposed in the second display region,
the plurality of scanning signal lines correspond to a first row to an Mth row,
the plurality of second scanning signal lines correspond to the first row to an Nth row,
the plurality of first scanning signal lines correspond to an (N+1)th row to the Mth row, and
after repeating driving of the second scanning signal lines in the first row to the Nth row a plurality of times with the plurality of first switching elements turned off, driving of the first scanning signal lines in the (N+1)th row to the Mth row is performed with the plurality of first switching elements turned on.

13. The display device according to claim 11, wherein the scanning signal line drive circuit includes a first scanning signal line drive circuit configured to drive the plurality of first scanning signal lines based on a first start pulse signal and a second scanning signal line drive circuit configured to drive the plurality of second scanning signal lines based on a second start pulse signal, and
when the plurality of first scanning signal lines are driven by the first scanning signal line drive circuit, the plurality of first switching elements are turned on.

14. The display device according to claim 11, comprising a control circuit configured to output an enable signal that performs control as to whether to allow driving of scanning signal lines, wherein
when the enable signal is at an on level, driving of scanning signal lines is possible, and
regarding Z consecutive vertical scanning periods, in first to (Z−1)th vertical scanning periods, the control circuit maintains the enable signal at an on level only during a period during which the plurality of second scanning signal lines are to be driven, and in a Zth vertical scanning period, the control circuit maintains the enable signal at an on level during both of a period during which the plurality of second scanning signal lines are to be driven and a period during which the plurality of first scanning signal lines are to be driven, wherein Z is an integer greater than or equal to 2.

15. The display device according to claim 11, wherein when any of the plurality of first scanning signal lines is driven, the plurality of first switching elements are turned on, and
when any of the plurality of second scanning signal lines is driven, the plurality of first switching elements are turned off.

16. The display device according to claim 1, wherein a moving image is displayed in the second display region while a still image is displayed in the first display region.

* * * * *